United States Patent
Asada et al.

(10) Patent No.: US 12,460,111 B2
(45) Date of Patent: Nov. 4, 2025

(54) REINFORCING FIBERS AND PRODUCTION METHOD THEREFOR, AND MOLDED ARTICLE USING SAME

(71) Applicant: KURARAY CO., LTD., Kurashiki (JP)

(72) Inventors: Toru Asada, Okayama (JP); Daisuke Koda, Kamisu (JP); Shinichi Takemoto, Okayama (JP); Hiroyuki Kawai, Okayama (JP); Shuhei Yorimitsu, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 530 days.

(21) Appl. No.: 17/059,103

(22) PCT Filed: May 28, 2019

(86) PCT No.: PCT/JP2019/021036
§ 371 (c)(1),
(2) Date: Nov. 25, 2020

(87) PCT Pub. No.: WO2019/230700
PCT Pub. Date: Dec. 5, 2019

(65) Prior Publication Data
US 2021/0222036 A1 Jul. 22, 2021

(30) Foreign Application Priority Data
May 29, 2018 (JP) .................. 2018-102577

(51) Int. Cl.
*C09J 109/00* (2006.01)
*B60C 9/00* (2006.01)
*C08J 5/06* (2006.01)
*C08L 9/00* (2006.01)

(52) U.S. Cl.
CPC .............. *C09J 109/00* (2013.01); *C08J 5/06* (2013.01); *C08L 9/00* (2013.01); *B60C 9/0042* (2013.01); *B60C 2009/0071* (2013.01); *C08J 2309/00* (2013.01); *C08J 2467/00* (2013.01); *C08L 2205/03* (2013.01); *C08L 2205/16* (2013.01)

(58) Field of Classification Search
CPC ......... C09J 109/00; B60C 9/0042; C08J 5/06; C08L 2205/16
See application file for complete search history.

(56) References Cited

U.S. PATENT DOCUMENTS

| | | |
|---|---|---|
| 5,077,108 A | 12/1991 | Ozawa et al. |
| 5,861,212 A | 1/1999 | Mori et al. |
| 2002/0144779 A1 | 10/2002 | Pelton |
| 2005/0147817 A1 | 7/2005 | Pelton |
| 2015/0167232 A1* | 6/2015 | Manabe ............... D02G 3/446 428/395 |
| 2016/0289501 A1 | 10/2016 | Nakashima et al. |
| 2017/0130014 A1 | 5/2017 | Anyaogu et al. |
| 2017/0211225 A1* | 7/2017 | Maeda .................. C08C 19/22 |
| 2017/0306555 A1* | 10/2017 | Ueda ......................... C08J 5/06 |
| 2020/0262988 A1 | 8/2020 | Anyaogu et al. |

FOREIGN PATENT DOCUMENTS

| | | | |
|---|---|---|---|
| CN | 105121580 A | 12/2015 | |
| EP | 2 607 381 A1 | 6/2013 | |
| JP | 46-015013 B1 | 4/1971 | |
| JP | 54-4976 | 1/1979 | |
| JP | 55-139257 | 10/1980 | |
| JP | S56161424 A * | 12/1981 | |
| JP | 58-2370 A | 1/1983 | |
| JP | 60-209071 A | 10/1985 | |
| JP | 10-195208 A | 7/1998 | |
| JP | 2004308061 A * | 11/2004 | |
| JP | 2009-275781 A | 11/2009 | |
| JP | WO2010/125992 A1 | 11/2010 | |
| JP | 2011-111563 A | 6/2011 | |
| JP | 2012-092459 A | 5/2012 | |
| JP | 2012-144741 A | 8/2012 | |
| JP | 2017-13287 A | 1/2017 | |
| WO | WO 96/00749 A1 | 1/1996 | |
| WO | WO-2015137295 A1 * | 9/2015 | ............... B60C 1/00 |

OTHER PUBLICATIONS

Translation of JP-2011111563-A from PatentScope (Year: 2011).*
Translation of JP-2012144741-A from PatentScope. (Year: 2012).*
Translation of JP-2004308061-A from PatentScope (Year: 2004).*
Machine translation of JPS60209071A obtained from IP.com (Year: 1985).*
Machine translation of WO-2015137295-A1 obtained from WIPO Patentscope (Year: 2015).*
Machine translation of JPS6031327B2, family member of JPS56161424A, obtained from Espacenet (Year: 1985).*
Indian Office Action issued Dec. 27, 2021 in Indian Patent Application No. 202047051773, 7 pages.
G.S. Deshmukh, et al., "Effect of functionalized elastomer addition on mechanical and interfacial properties of poly (butylene terephthalate)/ glass fiber composites," Polymer Composites, vol. 33, No. 1, 2012, 1 page (submitting Abstract only).

(Continued)

*Primary Examiner* — Kregg T Brooks
*Assistant Examiner* — David R. Foss
(74) *Attorney, Agent, or Firm* — Oblon, McClelland, Maier & Neustadt, L.L.P.

(57) ABSTRACT

Reinforcing fibers containing hydrophilic fibers and an adhesive component, wherein at least a part of the surfaces of the hydrophilic fibers have the adhesive component, the adhesive component contains a modified conjugated diene rubber having a hydrogen-bonding functional group in a part of the conjugated diene rubber, and the number of the hydrogen-bonding functional groups in the modified conjugated diene rubber is 2 to 150 per molecule on average; a method for producing the reinforcing fibers; and a molded article using the reinforcing fibers.

20 Claims, No Drawings

(56) References Cited

OTHER PUBLICATIONS

Extended European Search Report issued Jan. 21, 2022 in European Patent Application No. 19812019.8, 7 pages.
Xu, "Development and Properties of Adhesives for Powdered Nonwovens", China Textile University, Dec. 31, 1995, pp. 95-97 (11 total pages) (with unedited computer-generated English translation).
International Search Report issued on Aug. 20, 2019 in PCT/JP2019/021036 filed on May 28, 2019, 2 pages.

* cited by examiner

REINFORCING FIBERS AND PRODUCTION METHOD THEREFOR, AND MOLDED ARTICLE USING SAME

TECHNICAL FIELD

The present invention relates to reinforcing fibers excellent in adhesiveness to rubber and a method for producing them, as well as a molded article using them.

BACKGROUND ART

In general, industrial rubber products such as tires, conveyor belts and hoses (e.g., oil brake hoses for vehicles) are reinforced with synthetic fibers such as vinylon or rayon fibers, or natural fibers such as cotton fibers. In order that these products can fully express excellent physical characteristics of rubber (e.g., high strength and high elastic modulus), fibers and rubber need to be firmly bonded to each other. Heretofore, as such a method, widely known is a method of using an adhesive called RFL that contains a resorcinol-formalin resin and a rubber latex as main ingredients (PTLs 1 and 2).

However, formalin is suspected of carcinogenicity, and resorcinol is suspected of being a endocrine-disrupting chemical, and therefore it is desired to develop some replacements.

Specifically, PTL 3 proposes a technique of using an adhesive that contains an adhesive compound having an unsaturated carbon bond and an epoxy group capable of reacting with a vulcanizing agent for use for vulcanization of rubber. PTL 4 proposes a bonding method of using an adhesive composition for organic fiber cords that contains a (blocked) isocyanate compound and/or an amine-based curing agent (A), an epoxy compound (B) and a rubber latex (C) but does not contain a resorcinol and a formalin. PTL 5 proposes a technique of dividing and thinning liquid rubber-adhered, rubber-reinforcing fibers by mechanical shear force.

CITATION LIST

Patent Literature

PTL 1: JP 54-4976 A
PTL 2: JP 58-2370 A
PTL 3: JP 2011-111563 A
PTL 4: WO2010/125992
PTL 5: JP 10-195208 A

SUMMARY OF INVENTION

Technical Problem

The method of using an adhesive described in PTL 3 is greatly inferior to a method of using an already-existing RFL in point of adhesiveness. This includes a description of adding a blocked isocyanate for increasing adhesion force, but in this case, the blocked isocyanate is polymerized substantially on the fibers to be an adherend and therefore requires high-temperature or/and long-time heat treatment, which, however, has a risk of degrading the adherend fibers.

The method of using an adhesive described in PTL 4 achieves an adhesion powder comparable to or more than that in a method of using an already-existing RFL, but requires heat treatment substantially at a high temperature (180° C. and 240° C.) after forming an adhesive layer on the surface of an organic fiber cord. In the case where organic fibers of PVA fibers or PET fibers that are often used as reinforcing fibers are treated according to the method, there is a risk of degradation of the reinforcing fibers to worsen the performance thereof. The technique described in PTL 5 is a technique of dividing and thinning rubber-reinforcing fibers by mechanical shear force to thereby achieve improvement of excellent dispersibility and reinforcing performance without detracting from the basic performance of a matrix rubber for use in producing a rubber molded article, but is still required to achieve further improvement in point of adhesion force to rubber.

Given the situation, a bonding method is required that achieves an adhesion force on the same level as that in an already-existing method of using RFL and does not cause degradation of general fibers.

The present invention has been made in consideration of the above-mentioned problems in the art and the subject matter thereof is to provide reinforcing fibers using an adhesive component not containing resorcinol and formalin and excellent in adhesiveness to rubber and a method for producing the reinforcing fibers, and to provide a molded article using the reinforcing fibers.

Solution to Problem

The present inventors have made assiduous studies for solving the above-mentioned problems and, as a result, have found that, when a modified conjugated diene rubber having a hydrogen-bonding functional group in a part of the conjugated diene rubber is used as an adhesive component and when the number of the hydrogen-bonding functional groups in the modified conjugated diene rubber falls within a specific range, reinforcing fibers excellent in adhesiveness to rubber can be obtained even though not using resorcinol and formalin, and have completed the present invention.

Specifically, the present invention relates to the following [1] to [3].

[1] Reinforcing fibers containing hydrophilic fibers and an adhesive component, wherein:
at least a part of the surfaces of the hydrophilic fibers have the adhesive component,
the adhesive component contains a modified conjugated diene rubber having a hydrogen-bonding functional group in a part of the conjugated diene rubber, and the number of the hydrogen-bonding functional groups in the modified conjugated diene rubber is 2 to 150 per molecule on average.

[2] A method for producing the reinforcing fibers of the above [1].

[3] A molded article using the reinforcing fibers of the above [1].

Advantageous Effects of Invention

The present invention can provide reinforcing fibers using an adhesive component not containing resorcinol and formalin, and excellent in adhesiveness to rubber, and a method for producing the reinforcing fibers, and also a molded article using the reinforcing fibers.

DESCRIPTION OF EMBODIMENTS

[Reinforcing Fibers]

The reinforcing fibers of the present invention are reinforcing fibers containing hydrophilic fibers and an adhesive component, in which at least a part of the surfaces of the hydrophilic fibers have the adhesive component, the adhesive component contains a modified conjugated diene rubber having a hydrogen-bonding functional group in a part of the conjugated diene rubber (hereinafter may also be referred to as "modified conjugated diene rubber"), and the number of the hydrogen-bonding functional groups in the modified conjugated diene rubber is 2 to 150 per molecule on average. According to the present invention, a modified conjugated diene rubber exists in at least a part of the surfaces of hydrophilic fibers to improve wettability of reinforcing fibers with rubber, and further the multiple bond that the modified conjugated diene rubber has reacts with rubber to form a bond, and accordingly, reinforcing fibers having an excellent adhesion force can be obtained.

In the present invention, the adhesive component may be contained in the hydrophilic fibers, but at least a part thereof exists in the surfaces of the hydrophilic fibers.

The adhesive component to be used in the present invention can provide reinforcing fibers excellent in adhesiveness to rubber even though not containing a resin that uses formaldehyde harmful to human bodies or uses a raw material of such formaldehyde. In the present invention, if the adhesive component contains a resin that uses formaldehyde as a raw material, examples of the resin include a resorcinol/formaldehyde resin, a phenol/formaldehyde resin, a melamine/formaldehyde resin and derivatives thereof. In the case where the adhesive component contains the formaldehyde component, the content thereof is preferably 10 parts by mass or less relative to 100 parts by mass of the conjugated diene rubber, more preferably 5 parts by mass or less, even more preferably 3 parts by mass or less, further more preferably 1 part by mass or less, and especially preferably the adhesive component does not substantially contain such a formaldehyde component. The formaldehyde content can be measured through HPLC after extraction of the adhesive component from reinforcing fibers with a solvent such as toluene.

<Adhesive Component>

The adhesive component for use in the present invention is not specifically limited so far as it contains a modified conjugated diene rubber having a hydrogen-bonding functional group in a part of the conjugated diene rubber and the number of the hydrogen-bonding functional groups in the modified conjugated diene rubber is 2 to 150 per molecule on average. According to the present invention, the modified conjugated diene rubber interacts with the adherends, rubber and hydrophilic fibers to thereby bond both the two. The modified conjugated diene rubber at least partly has a molecular structure similar to the adherend rubber, and therefore interacts through entanglement of molecular chains. In addition, the modified conjugated diene rubber and the adherend rubber form a covalent bond through vulcanization to generate strong cohesion force, and the adhesiveness therebetween further improves. Moreover, it is considered that the hydrogen-bonding functional group contained in the modified conjugated diene rubber may interact with hydrophilic fibers around the hydrogen bond thereof to further improve the adhesiveness.

Here, "hydrogen bond" means a bonding interaction to be formed between a hydrogen atom (donor) that bonds to an atom having a large electronegativity (e.g., O, N, S) and is polarized to be electrically positivity, and an atom (acceptor) having a lone electron pair to be electrically negativity.

In the present invention, "hydrogen-bonding functional group" is a functional group that functions as a donor and an acceptor at the hydrogen bond. Specifically, it includes a hydroxy group, an ether group, a mercapto group, a carboxy group, a carbonyl group, an aldehyde group, an amino group, an imino group, an imidazole group, an urethane group, an amide group, an urea group, an isocyanate group, a nitrile group, a silanol group and derivatives thereof. A derivative of an aldehyde group includes an acetalized form thereof. A derivative of a carboxy group includes a salt thereof, an ester thereof, an amidated form thereof, an an acid anhydride thereof. A derivative of a silanol group includes an esterified form thereof. A carboxy group includes a group derived from a monocarboxylic acid, and a group derived from a dicarboxylic acid. Among these, one or more selected from a hydroxy group; an aldehyde group and an acetalized form thereof; a carboxyl group, a salt thereof, an ester thereof, and an acid anhydride thereof; and a silanol group and an esterified form thereof are preferred.

The number of the hydrogen-bonding functional groups in the modified conjugated diene rubber is 2 to 150 per molecule on average. The number of the hydrogen-bonding functional groups is, from the viewpoint of achieving reinforcing fibers excellent in adhesiveness to rubber, 2 or more, preferably 3 or more, more preferably 4 or more per molecule on average. Also the number of the hydrogen-bonding functional groups is, from the viewpoint of controlling the viscosity of the modified conjugated diene rubber to fall within an appropriate range to improve handleability, 150 or less per molecule on average, preferably 120 or less, more preferably 80 or less, even more preferably 40 or less, further more preferably 30 or less, further more preferably 25 or less, further more preferably 20 or less, further more preferably 10 or less.

The average number of the hydrogen-bonding functional groups per molecule of the modified conjugated diene rubber is calculated from the equivalent (g/eq) of the hydrogen-bonding functional group of the modified conjugated diene rubber and the styrene-equivalent number-average molecular weight Mn thereof, according to the following expression. The equivalent of the hydrogen-bonding functional group of the modified conjugated diene rubber means a mass of the conjugated diene bonding to one hydrogen-bonding functional group and any other optional monomer than the conjugated diene.

Average number of hydrogen-bonding functional groups per molecule=[(number-average molecular weight (Mn))/(molecular weight of styrene unit)×(average molecular weight of conjugated diene and any other optional monomer unit than conjugated diene)]/(equivalent of hydrogen-bonding functional group)

The method for calculating the equivalent of the hydrogen-bonding functional group can be appropriately selected depending on the kind of the hydrogen-bonding functional group.

The modified conjugated diene rubber contains at least a conjugated diene-derived monomer unit (hereinafter also may be referred to as "conjugated diene unit") in the molecule, and preferably contains a conjugated diene unit in at least a part of the polymer chain and has a hydrogen-bonding functional group I the side chain or at the end of the polymer chain.

Examples of the conjugated diene unit include butadiene, 2-methyl-1,3-butadiene (hereinafter also may be referred to as "isoprene"), 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, β-farnesene, α-farnesene and chloroprene. One alone or two or more kinds of these conjugated dienes may be used either singly or as combined.

From the viewpoint of reactivity in vulcanization, preferably, the modified conjugated diene rubber has a monomer unit derived from one or more selected from butadiene and isoprene in the molecule, and more preferably has a butadiene-derived monomer unit.

Examples of the method for producing the modified conjugated diene rubber include a method of adding a modifying compound to a polymerization product of a conjugated diene monomer (hereinafter also may be referred to as "production method (1)"), a method of copolymerizing a conjugated diene monomer and a hydrogen-bonding functional group-having radical polymerizable compound (hereinafter also may be referred to as "production method (2)"), and a method of adding a modifying compound capable of reacting with the polymerization-active end of a polymerization product of a polymerization-active end-having unmodified conjugated diene monomer before adding a polymerization terminator to the polymerization product (hereinafter also may be referred to as "production method (3)").

[Production Method (1) for Modified Conjugated Diene Rubber]

The production method (1) is a method of adding a modifying compound to a polymerization product of a conjugated diene monomer, that is, an unmodified conjugated diene rubber (hereinafter also may be referred to as "unmodified conjugated diene rubber").

The unmodified conjugated diene rubber can be prepared by polymerizing a conjugated diene optionally along with any other monomer than the conjugated diene, for example, according to an emulsion polymerization method or a solution polymerization method.

A known method or a method equivalent to a known method is applicable to the emulsion polymerization method. For example, a predetermined amount of a conjugated diene-containing monomer is emulsified and dispersed in the presence of an emulsifier and then polymerized in emulsion with a radical polymerization initiator.

Examples of the emulsifier include a long-chain fatty acid salt having 10 or more carbon atoms, and a rosin acid salt. Examples of the long-chain fatty acid salt include potassium salts or sodium salts of a fatty acid such as capric acid, lauric acid, myristic acid, palmitic acid, oleic acid, and stearic acid.

As a dispersion solvent, in general, water is used, and may contain a water-soluble organic solvent such as methanol or ethanol within a range not interfering with the stability during polymerization.

Examples of the radical polymerization initiator include persulfates such as ammonium persulfate and potassium persulfate, and organic peroxides and hydrogen peroxide.

For controlling the molecular weight of the resultant unmodified conjugated diene rubber, a chain transfer may be used. Examples of the chain transfer include mercaptans such as t-dodecylmercaptan, and n-dodecylmercaptan; and carbon tetrachloride, thioglycolic acid, diterpene, terpinolene, γ-terpinene, and α-methylstyrene dimer.

The temperature of emulsion polymerization can be appropriately set depending on the kind of the radical polymerization initiator to be used, but is generally within a range of 0 to 100° C., preferably within a range of 0 to 60° C. The polymerization mode may be any of continuous polymerization or batch polymerization.

The polymerization reaction can be terminated by adding a polymerization terminator. Examples of the polymerization terminator include amine compounds such as isopropylhydroxylamine, diethylhydroxylamine, and hydroxylamine; quinone compounds such as hydroquinone and benzoquinone, and sodium nitrite.

After termination of polymerization reaction, if desired, an antiaging agent may be added. After termination of polymerization reaction, if desired, the unreacted monomer is removed from the resultant latex, and then a salt such as sodium chloride, calcium chloride or potassium chloride is added as a coagulant, and optionally while an acid such as nitric acid or sulfuric acid is added to control the pH of the coagulation system to be a predetermined value, the polymerization product is coagulated and then the dispersion solvent is remove to collect the polymerization product. Next, this is washed with water and dewatered, and then dried to give an unmodified conjugated diene rubber. In coagulation, if desired, the latex may be previously mixed with an extension oil in the form of an emulsion dispersion liquid to collect the resultant, extended unmodified conjugated diene rubber.

A known method or a method equivalent to a known method is applicable to the solution polymerization method. For example, using a Ziegler catalyst, a metallocene catalyst, or an anion polymerizable active metal or active metal compound in a solvent, and optionally in the presence of a polar compound, a predetermined amount of a conjugated diene-containing monomer is polymerized.

Examples of the solvent include aliphatic hydrocarbons such as n-butane, n-pentane, isopentane, n-hexane, n-heptane, and isooctane; alicyclic hydrocarbons such as cyclopentane, cyclohexane, and methylcyclopentane; and aromatic hydrocarbons such as benzene, toluene, and xylene.

Examples of the anion polymerizable active metal include alkali metals such as lithium, sodium, and potassium; alkaline earth metals such as beryllium, magnesium, calcium, strontium, and barium; and lanthanoid rare earth metals such as lanthanum, and neodymium. Among these anion polymerizable metals, alkali metals and alkaline earth metals are preferred, and alkali metals are more preferred.

The anion polymerizable active metal compound is preferably an organic alkali metal compound. Examples of the organic alkali metal compound include organic monolithium compounds such as methyl lithium, ethyl lithium, n-butyl lithium, sec-butyl lithium, t-butyl lithium, hexyl lithium, phenyl lithium, and stilbene lithium; polyfunctional organic lithium compounds such as dilithiomethane, dilithionaphthalene, 1,4-dilithiobutane, 1,4-dilithio-2-ethylcyclohexane, and 1,3,5-trilithiobenzene; and sodium naphthalene, and potassium naphthalane. Among these organic alkali metal compounds, organic lithium compounds are preferred, and organic monolithium compounds are more preferred.

The amount of the organic alkali metal compound to be used may be appropriately set depending on the melt viscosity and the molecular weight of the unmodified conjugated diene rubber and the modified conjugated diene rubber, and is generally 0.01 to 3 parts by mass relative to 100 parts by mass of all monomers including the conjugated diene.

The organic alkali metal compound can be used as an organic alkali metal amide formed through reaction with a secondary amine such as dibutylamine, dihexylamine or dibenzylamine.

Apolar compound is used in anion polymerization generally for controlling the microstructure of the conjugated diene moiety without deactivating the reaction. Examples of the polar compound include ether compounds such as dibutyl ether, tetrahydrofuran, and ethylene glycol diethyl ether; tertiary amines such as tetramethylethylenediamine, and trimethylamine; and alkali metal alkoxides and phosphine compounds. The polar compound can be used generally in an amount of 0.01 to 1000 mols relative to the organic alkali metal compound.

The temperature of solution polymerization is generally within a range of −80 to 150° C., preferably within a range of 0 to 100° C., more preferably within a range of 10 to 90° C. The polymerization mode may be any of a batch mode or a continuous mode.

The polymerization reaction can be terminated by addition of a polymerization terminator. Examples of the polymerization terminator include alcohols such as methanol and isopropanol. The resultant polymerization reaction liquid is poured into a poor solvent such as methanol to precipitate the polymerization product, or the polymerization reaction liquid is washed with water, then separated and dried to isolate an unmodified conjugated diene rubber.

As the production method for an unmodified conjugated diene rubber, a solution polymerization method is preferred among the above-mentioned methods.

(Modifying Compound for Use in Production Method (1))

The modifying method for use in the production method (1) is not specifically limited so far as it has a hydrogen-bonding functional group. The hydrogen-bonding functional group may be the same as mentioned above. Among them, from the viewpoint of the intensity of the hydrogen-bonding force thereof, an amino group, an imidazole group, an urea group, a hydroxy group, a mercapto group, a silanol group, an aldehyde group, a carboxy group and derivatives thereof are preferred. The derivatives of a carboxy group are preferably salts, amides or acid anhydrides thereof. One alone or two or more kinds of these hydrogen-bonding functional group-having modifying compounds can be used either singly or as combined.

Examples of the modifying compound include unsaturated carboxylic acids such as maleic acid, fumaric acid, citraconic acid, and itaconic acid; unsaturated carboxylic acid anhydrides such as maleic anhydride, citraconic anhydride, 2,3-dimethylmaleic anhydride, and itaconic anhydride; unsaturated carboxylates such as maleates, fumarates, citraconates, and itaconates; unsaturated carboxylic acid amides such as maleic acid amide, fumaric acid amide, citraconic acid amide, and itaconic acid amide; unsaturated carboxylic acid imides such as maleic acid imide, fumaric acid imide, citraconic acid imide, and itaconic acid imide; and silane compounds such as vinyltrimethoxysilane, γ-methacryloxypropyltrimethoxysilane, mercaptomethylmethyldiethoxysilane, mercaptomethyltriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane, and 3-mercaptopropylethoxydimethylsilane.

The amount of the modifying compound to be used is preferably within a range of 0.1 to 100 parts by mass relative to 100 parts by mass of the unmodified conjugated diene compound, more preferably 0.5 to 50 parts by mass. The reaction temperature is generally preferably within a range of 0 to 200° C.

After the modifying compound is grafted to the unmodified conjugated diene rubber to introduce a hydrogen-bonding functional group thereinto, a further modifying compound capable of reacting with the functional group may be added to introduce another hydrogen-bonding functional group into the polymer. Specifically, one example is a method where a maleic anhydride is grafted to an unmodified conjugated diene rubber prepared through living anion polymerization, and thereafter the resultant polymer is further reacted with a compound such as 2-hydroxyethyl methacrylate, methanol or water.

The amount of the modifying compound added to the modified conjugated diene rubber is preferably 0.5 to 40 parts by mass relative to 100 parts by mass of the unmodified conjugated diene rubber, more preferably 1 to 30 parts by mass, even more preferably 1.5 to 20 parts by mass. The amount of the modifying compound added to the modified conjugated diene rubber can be calculated based on the acid value of the modifying compound to be described hereinunder, or can also be determined using various analyzers for infrared spectrometry or nuclear magnetic resonance spectrometry.

The method of adding the modifying compound to an unmodified conjugated diene rubber is not specifically limited. One example employable here is a method of adding an unsaturated carboxylic acid or an unsaturated carboxylic acid derivative or a silane compound, and optionally a radical generator are added to a liquid unmodified conjugated diene rubber, and heating them in the presence or absence of an organic solvent. The radical generator to be used is not specifically limited, and any ordinary commercially-available organic peroxides, azo compounds and hydrogen peroxide are usable.

The organic solvent for use in the method generally includes hydrocarbon solvents and halogenohydrocarbon solvents. Among these organic solvents, hydrocarbon solvents such as n-butane, n-hexane, n-heptane, cyclohexane, benzene, toluene and xylene are preferred.

Further, in reaction of adding a modifying compound according to the above-mentioned method, an antiaging agent may be added from the viewpoint of preventing side reactions. Any ordinary commercially-available antiaging agent is usable, and examples thereof include butylated hydroxytoluene (BHT), and N-phenyl-N'-(1,3-dimethylbutyl)-p-phenylenediamine (Nocrac 6C).

The amount of the antiaging agent to be added is preferably 0.01 to 10 parts by mass relative to 100 parts by mass of the unmodified conjugated diene rubber, more preferably 0.05 to 5 parts by mass.

[Production Method (2) for Modified Conjugated Diene Rubber]

The production method (2) includes a method of graft-copolymerizing a conjugated diene monomer and a hydrogen-bonding functional group-having radical polymerizable compound according to a known method of random copolymerization, block copolymerization or graft copolymerization.

(Radical Polymerizable Compound for Use in Production Method (2))

The hydrogen-bonding functional group-having radical polymerizable compound for use in the production method (2) is not specifically limited so far as it is a compound having a hydrogen-bonding functional group and a reactive multiple bond in the molecule. Specifically, the compound includes an aldehyde having a reactive multiple bond, and an acetalized form of the aldehyde; a monocarboxylic acid having a reactive multiple bond, a salt of the monocarboxylic acid, an esterified form of the monocarboxylic acid, and an acid anhydride of the monocarboxylic acid; a dicarboxylic acid having a reactive multiple bond, a salt of the dicarboxylic acid, an esterified form of the dicarboxylic acid, and an acid anhydride of the dicarboxylic acid; and an amine compound having a reactive multiple bond.

Among the multiple bond-having aldehydes, examples of aldehydes having a reactive carbon-carbon double bond include unsaturated aldehydes, such as alkenals having 3 to 30 carbon atoms, preferably alkenals having 3 to 25 carbon atoms, such as acrolein, methacrolein, crotonaldehyde, 3-butenal, 2-methyl-2-butenal, 2-methyl-3-butenal, 2,2-dimethyl-3-butenal, 3-methyl-2-butenal, 3-methyl-3-butenal, 2-pentenal, 2-methyl-2-pentenal, 3-pentenal, 3-methyl-4-pentenal, 4-pentenal, 4-methyl-4-pentenal, 2-hexenal, 3-hexenal, 4-hexenal, 5-hexenal, 7-octenal, 10-undecenal, 2-ethylcrotonaldehyde, 3-(dimethylamino)acrolein, myristoleinaldehyde, palmitoleinaldehyde, oleinaldehyde, elaidinaldehyde, baxenaldehyde, gadoleinaldehyde, erucaldehyde, nerbonaldehyde, linolaldehyde, citronellol, cinnamaldehyde, and vanillin; alkadienals having 5 to 30 carbon atoms, preferably alkadienals having 5 to 25 carbon atoms, such as 2,4-pentadienal, 2,4-hexadienal, 2,6-nonadienal, and citral; alkatrienals having 7 to 30 carbon atoms, preferably alkatrienals having 7 to 25 carbon atoms, such as linolenaldehyde, and ereostearinaldehyde; alkatetraenals having 9 to 30 carbon atoms, preferably alkatetraenals having 9 to 25 carbon atoms, such as stearidonaldehyde, and arachidonaldehyde; and alkapentaenals having 11 to 30 carbon atoms, preferably alkapentaenals having 11 to 25 carbon atoms, such as eicosapentaenaldehyde. Among the aldehydes, those having cis-trans isomers include both cis-forms and trans-forms. One alone or two or more kinds of these aldehydes may be used either singly or as combined.

Among the acetalized forms of multiple bond-having aldehydes, acetalized forms of reactive carbon-carbon double bond-having aldehydes include acetalized forms of the above-mentioned aldehydes, concretely, 3-(1,3-dioxalan-2-yl)-3-methyl-1-propene that is an acetalized form of 2-methyl-3-butenal, and 3-(1,3-dioxalan-2-yl)-2-methyl-1-propene that is an acetalized form of 3-methyl-3-butenal.

Among the multiple bond-having aldehydes and the acetalized forms of the aldehydes, reactive carbon-carbon triple bond-having aldehydes and acetalized forms thereof include carbon-carbon triple bond-having aldehydes such as propioladehyde, 2-butyn-1-al and 2-pentyn-1-al, and acetalized forms of the aldehydes.

Among the multiple bond-having aldehydes and the acetalized forms of the aldehydes, reactive carbon-carbon double bond-having aldehydes are preferred, and for example, one or more selected from acrolein, methacrolein, crotonaldehyde, 3-butenal, 2-methyl-2-butenal, 2-methyl-3-butenal, 2,2-dimethyl-3-butenal, 3-methyl-2-butenal, 3-methyl-3-butenal, 2-pentenal, 2-methyl-2-pentenal, 3-pentenal, 3-methyl-4-pentenal, 4-pentenal, 4-methyl-4-pentenal, 2-hexenal, 3-hexenal, 4-hexenal, 5-hexenal, 7-octenal, 2-ethylcrotonaldehyde, 3-(dimethylamino)acrolein, and 2,4-pentadienal are preferred. Above all, as having good reactivity in copolymerization, one or more selected from acrolein, methacrolein, crotonalehyde, and 3-butenal are more preferred.

Examples of the multiple bond-having monocarboxylic acids, salts of the monocarboxylic acids, esterified bodies of the monocarboxylic acids, and acid anhydrides of the monocarboxylic acids include reactive carbon-carbon double bond-having carboxylic acids, salts of the carboxylic acids, esterified forms of the carboxylic acids, and acid anhydrides of the carboxylic acids, such as (meth)acrylic acid, sodium (meth)acrylate, potassium (meth)acrylate, methyl (meth)acrylate, ethyl (meth)acrylate, butyl (meth)acrylate, propyl (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, vinyl (meth)acrylate, 2-(trifluoromethyl)acrylic acid, methyl 2-trifluoromethylacrylate, ethyl 2-trifluoromethylacrylate, propyl 2-trifluoromethylacrylate, 2-butyl 2-trifluoromethylacrylate, 2-hydroxyethyl 2-trifluoromethylacrylate, vinyl 2-trifluoromethylacrylate, methyl cinnamate, vinyl cinnamate, methyl crotonate, vinyl crotonate, methyl 3-methyl-3-butenoate, vinyl 3-methyl-3-butenoate, methyl 4-pentenoate, vinyl 4-pentenoate, methyl-2-methyl-4-pentenoate, vinyl 2-methyl-4-pentenoate, methyl 5-hexenoate, vinyl 5-hexenoate, methyl 3,3-dimethyl-4-pentenoate, vinyl 3,3-dimethyl-4-pentenoate, methyl 7-octenoate, vinyl 7-octenoate, methyl trans-3-pentenoate, vinyl trans-3-pentenoate, methyl trans-4-decenoate, vinyl trans-4-decenoate, ethyl 3-methyl-3-butenoate, ethyl 4-pentenoate, ethyl 2-methyl-4-pentenoate, ethyl 5-hexenoate, ethyl 3,3-dimethyl-4-pentenoate, ethyl 7-octenoate, ethyl trans-3-pentenoate, ethyl trans-4-decenoate, methyl 10-undecenoate, vinyl 10-undecenoate, (meth)acrylic anhydride, 2-(trifluoromethyl)acrylic anhydride, cinnamic anhydride, crotonic anhydride, 3-methyl-3-butenoic anhydride, 4-pentenoic anhydride, 2-methyl-4-pentenoic anhydride, 5-hexenoic anhydride, 3,3-dimethyl-4-pentenoic anhydride, 7-octenoic anhydride, trans-3-pentenoic anhydride, trans-4-decenoic anhydride, 3-methyl-3-butenoic anhydride, 4-pentenoic anhydride, 2-methyl-4-pentenoic anhydride, and 10-undecenoic anhydride; and reactive carbon-carbon triple bond-having carboxylic acids and esterified forms of the carboxylic acids, such as propiolic acid, methyl propiolate, ethyl propiolate, vinyl propiolate, tetrolic acid, methyl tetrolate, ethyl tetrolate, and vinyl tetrolate.

In this description, the above-mentioned "(meth)acrylic acid" collectively means "acrylic acid" and "methacrylic acid".

Examples of the multiple bond-having dicarboxylic acids, salts of the dicarboxylic acids, esterified forms of the dicarboxylic acids, and acid anhydrides of the dicarboxylic acids include reactive carbon-carbon double bond-having dicarboxylic acids, salts of the dicarboxylic acids, esterified forms of the dicarboxylic acids, and acid anhydrides of the dicarboxylic acids, such as maleic acid, sodium malate, potassium maleate, methyl maleate, dimethyl maleate, maleic anhydride, itaconic acid, methyl itaconate, dimethyl itaconate, itaconic anhydride, himic acid, methyl himate, dimethyl himate, and himic anhydride.

Among the above-mentioned multiple bond-having monocarboxylic acids, salts of the monocarboxylic acids, esterified forms of the monocarboxylic acids, the monocarboxylic acid anhydrides, the above-mentioned multiple bond-having dicarboxylic acids, salts of the dicarboxylic acids, esterified forms of the dicarboxylic acids, and the dicarboxylic acid anhydrides, reactive carbon-carbon double bond-having compounds are preferred, and above all, as having good reactivity in copolymerization, one or more selected from methyl (meth)acrylate, ethyl (meth)acrylate, butyl (meth)acrylate, vinyl (meth)acrylate, (meth)acrylic anhydride, 2-(trifluoromethyl)acrylic anhydride, cinnamic anhydride, crotonic anhydride, methyl maleate, dimethyl maleate, maleic anhydride, methyl itaconates, dimethyl itaconates and itaconic anhydride are more preferred.

Among the above-mentioned multiple bond-having amine compounds, examples of the reactive carbon-carbon double bond-having amine compounds include allylamine, 3-butenylamine, 4-pentenylamine, 5-hexenylamine, 6-heptenylamine, 7-octenylamine, oleylamine, 2-methylallylamine, 4-aminostyrene, 4-vinylbenzylamine, 2-allylglycine, S-allylcysteine, α-allylaniline, 2-allylaniline, geranylamine, vigabatrin, 4-vinylaniline, and 4-vinyloxyaniline. Among these, as having good reactivity in copolymerization, one or more selected from allylamine, 3-butenylamine and 4-pentenylamine are preferred.

[Production Method (3) for Modified Conjugated Diene Rubber]

The production method (3) is a method of adding a modifying compound capable of reacting with the polymerization-active end of a polymerization product of a polymerization-active end-having unmodified conjugated diene monomer (unmodified conjugated diene rubber) before a polymerization terminator is added to the polymerization product. The polymerization-active end-having unmodified conjugated diene rubber can be prepared by polymerizing a conjugated diene monomer optionally along with any other monomer than the conjugated diene, for example, according to an emulsion polymerization method or a solution polymerization method, in the same manner as in the above-mentioned production method (1).

Examples of the modifying compound usable in the production method (3) include modifying agents such as dimethyldiethoxysilane, tetramethoxysilane, tetraethoxysilane, 3-aminopropyltriethoxysilane, tetraglycidyl-1,3-bisaminomethylcyclohexane, 2,4-tolylene diisocyanate, carbon dioxide, ethylene oxide, succinic anhydride, 4,4'-bis(diethylamino)benzophenone, N-vinylpyrrolidone, N-methylpyrrolidone, 4-dimethylaminobenzylidene-aniline, and dimethylimidazolidinone, and other modifying agents described in JP 2011-132298 A.

The amount of the modifying compound to be used is, in the case where an organic alkali metal compound is used for polymerization, preferably within a range of 0.01 to 100 molar equivalents relative to the organic alkali metal compound. The reaction temperature is generally within a range of −80 to 150° C., preferably 0 to 100° C., more preferably 10 to 90° C.

After the modifying compound has been added to introduce a hydrogen-bonding functional group into an unmodified conjugated diene rubber before addition of a polymerization initiator, a modifying compound capable of reacting with the functional group can be added to further introduce another hydrogen-bonding functional group into the polymer.

The unmodified conjugated diene rubber may contain a unit derived from any other monomer than the above-mentioned conjugated diene monomer and the hydrogen-bonding functional group-having radical polymerizable compound within a range not interfering with adhesiveness. The other monomer incudes a copolymerizable ethylenic unsaturated monomer and an aromatic vinyl compound.

Examples of the ethylenic unsaturated monomer include olefins such as ethylene, 1-butene, and isobutene.

Examples of the aromatic vinyl compound include styrene, α-methylstyrene, 2-methylstyrene 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. One alone or two or more kinds of these may be used either singly or as combined.

In the case where the modified conjugated diene rubber contains a monomer unit derived from the above-mentioned ethylenic unsaturated monomer and/or the above-mentioned aromatic vinyl compound, the content thereof is preferably 30 mol % or less, more preferably 10 mol % or less, even more preferably 5 mol % or less.

The production method for the modified conjugated diene rubber is not specifically limited, but from the viewpoint of productivity, the production method (1) or (2) is preferred, and the production method (1) is more preferred.

(Physical Properties of Modified Conjugated Diene Rubber)

The weight-average molecular weight (Mw) of the modified conjugated diene rubber is not specifically limited, but is, from the viewpoint of handleability, preferably 200,000 or less, more preferably 120,000 or less, even more preferably 100,000 or less, further more preferably 75,000 or less, especially more preferably 50,000 or less, and is, from the viewpoint of improving adhesiveness, preferably more than 10,000, more preferably 20,000 or more, even more preferably 22,000 or more, and further more preferably 25,000 or more.

The number-average molecular weight (Mn) of the modified conjugated diene rubber is not specifically limited, but is, from the viewpoint of handleability, preferably 200,000 or less, more preferably 120,000 or less, even more preferably 100,000 or less, further more preferably 75,000 or less, especially more preferably 50,000 or less, and is, from the viewpoint of improving adhesiveness, preferably more than 10,000, more preferably 20,000 or more, even more preferably 22,000 or more, especially more preferably 25,000 or more.

Mw and Mn of the modified conjugated diene rubber each are a polystyrene-equivalent weight-average molecular weight or number-average molecular weight, respectively, derived from measurement through gel permeation chromatography (GPC).

The molecular weight distribution (Mw/Mn) of the modified conjugated dine rubber is preferably 1.0 to 5.0, more preferably 1.0 to 3.0, even more preferably 1.0 to 2.0, further more preferably 1.0 to 1.5, especially more preferably 1.0 to 1.3. When Mw/Mn falls within the above range, fluctuation of the viscosity of the modified conjugated diene rubber is small and therefore handleability thereof is good. The molecular weight distribution (Mw/Mn) means a ratio of standard polystyrene-equivalent weight-average molecular weight (Mw)/number-average molecular weight (Mn) determined through GPC.

From the viewpoint of adhesiveness between the modified conjugated diene rubber and hydrophilic fibers, the modified conjugated diene rubber is preferably liquid.

In this description, "liquid" means that the melt viscosity measured at 38° C. of the modified conjugated diene rubber is 0.1 to 4,000 Pa·s. The melt viscosity is preferably 1 to 2,000 Pa·s, more preferably 1 to 1,000 Pa·s. The melt viscosity of the modified conjugated diene rubber is a value measured with a Brookfield viscometer at 38° C.

The glass transition temperature (Tg) of the modified conjugated diene rubber can vary depending on the vinyl content of the conjugated diene unit, the kind of the conjugated diene, and the content of the unit derived from any other monomer than the conjugated diene, but is preferably −100 to 10° C., more preferably −100 to 0° C., even more preferably −100 to −5° C. When Tg falls within the above range, viscosity increase can be prevented to better handleability.

The vinyl content of the modified conjugated diene rubber is preferably 99 mol % or less, more preferably 90 mol % or less. In this description, "vinyl content" means a total mol % of the conjugated diene unit bonding via a 1,2-bond or a 3,4-bond (conjugated diene unit bonding via any other than a 1,4-bond), in 100 mol % of the total of the conjugated diene units contained in the modified liquid diene rubber. The vinyl content can be calculated from the integrated value ratio of the signal derived from the conjugated diene unit bonding via a 1,2-bond or a 3,4-bond to the signal derived from the conjugated diene unit bonding via a 1,4-bond, in $^1$H-NMR.

One alone or two or more kinds of the modified conjugated diene rubber can be used either singly or as combined.

The adhesive component may contain any other component than the modified conjugated diene rubber within a range not interfering with the adhesion force thereof to rubber.

The other component includes other polymers (e.g., unmodified conjugated diene rubber), acids, alkalis, antioxidants, curing agents, dispersants, pigments, dyes, adhesion promoters, carbon black, and oily agents. Among these, from the viewpoint of lowering the viscosity of the adhesive component to improve the handleability thereof, preferably, an unmodified conjugated diene rubber and an oily agent mainly containing a mineral oil are used along with the modified conjugated diene rubber.

The content of the other component is, in the case where it contains an unmodified conjugated diene rubber and/or an oily agent, preferably 1 to 10,000 parts by mass relative to 100 parts by mass of the modified conjugated diene rubber, more preferably 30 to 5,000 parts by mass, even more preferably 50 to 1,000 parts by mass.

The content of the modified conjugated diene rubber in the adhesive component is, from the viewpoint of improving the adhesion force to rubber, preferably 10% by mass or more, more preferably 30% by mass or more, even more preferably 50% by mass or more, and is preferably 100% by mass or less.

<Hydrophilic Fibers>

The reinforcing fibers of the present invention are reinforcing fibers containing hydrophilic fibers and an adhesive component, and at least a part of the surfaces of the hydrophilic fibers have the adhesive component. The hydrophilic fibers usable in the present invention include synthetic fibers, natural fibers, and regenerated fibers. One alone or two or more kinds of hydrophilic fibers can be used either singly or as combined.

The hydrophilic synthetic fibers include synthetic fibers formed of a thermoplastic resin having a hydrophilic functional group such as a hydroxy group, a carboxy group, a sulfonic acid group, an an amino group, and/or a hydrophilic bond such as an amide bond.

Specific examples of such thermoplastic resins include polyvinyl alcohol resins, polyamide resins [e.g., aliphatic polyamides such as polyamide 6, polyamide 66, polyamide 11, polyamide 12, polyamide 610, polyamide 612, polyamide 9C (polyamide composed of nonanediamine and cyclohexane-dicarboxylic acid); semi-aromatic polyamides synthesized from an aromatic dicarboxylic acid and an aliphatic diamine such as polyamide 9T (polyamide formed of nonanediamine and terephthalic acid); and wholly-aromatic polyamides synthesized from an aromatic dicarboxylic acid and an aromatic diamine such as polyparaphenylene terephthalamidel, and polyacrylamide resins.

Among these, polyvinyl alcohol resins and polyamide resins are preferred. One alone or two or more kinds of hydrophilic synthetic fibers may be used either singly or as combined. These hydrophilic fibers may be further treated for hydrophilization to be mentioned below, for the purpose of more increasing the hydrophilicity thereof.

The hydrophilic natural fibers include natural cellulose fibers of wood pulp or cotton pulp such as kraft pulp, or non-wood pulp such as straw pulp.

The hydrophilic regenerated fibers include regenerated fibers of rayon, lyocell, cupra, or polynosic.

One alone or two or more kinds of these natural fibers and regenerated fibers can be used either singly or as combined. In addition, these hydrophilic natural fibers and regenerated fibers may be further treated for hydrophilization to be mentioned below, for the purpose of more increasing the hydrophilicity thereof.

The hydrophilic fibers may be hydrophilic at least at the surfaces thereof, and for example, they may also be fibers produced by hydrophilizing the surfaces of hydrophobic fibers, or core/sheath composite fibers in which the core part is formed of a hydrophobic resin and the sheath part is formed of a hydrophilic resin. Regarding examples of the hydrophilic resin to constitute the sheath part, reference may be made to the description of the hydrophilic synthetic fibers. Examples of the hydrophobic fibers formed of a hydrophobic resin include polyolefin fibers of polyethylene or polypropylene, polyester fibers of polyethylene terephthalate, and wholly-aromatic polyester fibers. Among these, polyester fibers are preferred.

Hydrophilization treatment is not specifically limited so far as it is a treatment for chemically or physically imparting a hydrophilic functional group to the surfaces of fibers. For example, the treatment includes a method of modifying hydrophobic fibers formed of the above-mentioned hydrophobic resin, with a compound containing a hydrophilic functional group such as an isocyanate group, an epoxy group or a hydroxy group; and a method of surface-modifying the hydrophobic fibers through irradiation with electron rays.

The hydrophilic fibers for use in the present invention are, from the viewpoint of using them for reinforcing fibers, preferably synthetic fibers of regenerated fibers, and above all, polyvinyl alcohol fibers formed of a raw material of a polyvinyl alcohol resin, as well as regenerated cellulose fibers, and fibers prepared by hydrophilizing the surfaces of hydrophobic fibers are preferred.

In the present invention, hydrophilic fibers are used, and accordingly, the modified conjugated diene rubber contained in the adhesive component and the hydrophilic fibers can express a strong affinity effect therebetween and, as a result, the adhesive component can firmly bond to the hydrophilic fibers to further enhance the adhesion force thereof to rubber.

As the polyvinyl alcohol fibers, those commercially sold by Kuraray Co., Ltd. as a trade name "Vinylon" having a single fiber fineness of 0.1 to 30 dtex or so are preferably used from the viewpoint of favorably using the reinforcing fibers of the present invention for automobile hoses, especially for brake oil hoses for automobiles.

[Production Method for Reinforcing Fibers]

The production method for the reinforcing fibers of the present invention is not specifically limited so far as it is a method for adhering or incorporating an adhesive component to or into at least a part of the surfaces of hydrophilic fibers.

In adhering the above-mentioned adhesive component to hydrophilic fibers, a solvent such as water, ethanol, propanol, butanol, methanol, toluene, xylene, acetone, hexane, tetrahydrofuran, methyl ethyl ketone, dioxane, tetrahydrofuran and ethyl acetate may be used in addition to the adhesive component. In the case where a solvent is used, the amount thereof to be used is preferably 10 to 99.9% by mass in the total of the adhesive component and the solvent, more preferably 40 to 99.9% by mass, even more preferably 70 to 99.0% by mass.

In the production method of the present invention, from the viewpoint of enhancing the adhesion force to rubber, a method (I) of forming an adhesive layer of the adhesive component on the surfaces of hydrophilic fibers, or a method (II) of producing fibers containing the adhesive component as a part of a raw material is preferred.

[Method (I)]

The method (I) is not specifically limited so far as it is a method of forming an adhesive layer of the adhesive component on the surfaces of hydrophilic fibers, but from the viewpoint of improving adhesiveness to rubber, the method preferably includes the following step I-1.

Step I-1: a step of adhering the adhesive component to the surfaces of hydrophilic fibers.

In the step I-1, the method of adhering the adhesive component to hydrophilic fibers is not specifically limited. Examples of the method include a method of adhering the adhesive component after the modified conjugated diene rubber contained therein is converted into an oil-in-water emulsion, a method of adhering the adhesive component after the modified conjugated diene rubber is dissolved in a solvent, and, in the case where the modified conjugated diene rubber is liquid, a method of adhering the adhesive component directly as it is, optionally after the viscosity thereof is adjusted.

The method of adhering the adhesive component is preferably carried out according one or more selected from dipping, roll coating, nozzle (spray) coating or brush coating.

In the case where the adhesive component is adhered after formed into an oil-in-water emulsion or after dissolved in a solvent, preferably, water or the solvent is evaporated away by drying treatment such as drying in air.

In the case where the modified conjugated diene rubber is dispersed in water and used in the form of an oil-in-water emulsion, preferably, an emulsion (latex) of the adhesive component is previously prepared according to a mechanical method or a chemical method and then it is diluted to have a predetermined concentration before use.

The mechanical method includes a homogenizer, a homomixer, a disperser mixer, a colloid mill, a pipeline mixer, a high-pressure homogenizer, and an ultrasonic emulsifying machine, and one alone or two or more of these may be used either singly or as combined.

The chemical method includes various methods of an inverse emulsification method, a D-phase emulsification method, an HLB temperature emulsification method, a gel emulsification method and a liquid crystal emulsification method, and from the viewpoint of achieving an emulsion of fine particles in a simplified manner, an inverse emulsification method is preferred. Also for producing an emulsion of fine particles, as the case may be, it may be preferable to carry out the operation while heating the system at an appropriate temperature (e.g., 30 to 80° C.) for the purpose of lowering the viscosity of the modified conjugated diene rubber. In preparing the emulsion, from the viewpoint of improving the stability of the emulsion, the solid concentration therein is preferably controlled to be 20 to 80% by mass, more preferably 30 to 70% by mass.

In the case where the modified conjugated diene rubber is dispersed in water to be an oil-in-water emulsion for use herein, preferably an emulsifier is used.

The emulsifier includes anionic soaps, e.g., fatty acid soaps such as potassium or sodium salts of oleic acid, lauric acid, myristic acid, palmitic acid or stearic acid, resin soaps such as potassium or sodium salts of rosin or disproportionated rosin, sulfonate soaps such as sodium or potassium salts of alkylbenzenesulfonic acid or alkylnaphthalene sulfonic acid, sulfate soaps such as sodium salts of oleate esters, laurate esters, or polyoxyethylene alkylsulfate esters, phosphate soaps such as hexadecyl phosphate, polyoxyethylene lauryl ether phosphate, polyoxyethylene tridecyl ether phosphate, or polyoxyethylene nonylphenyl phosphate; nonionic soaps such as polyoxyethylene nonylphenyl ether, polyethylene glycol laurate, or polyethylene glycol oleate; and cationic soaps, e.g., fatty acid amine hydrochlorides such as dodecylamine hydrochloride, and alkylpyridinium salts such as octyltrimethylammonium chloride, dioctyldimethylammonium chloride, benzyldimethyloctylammonium salts, or dodecylpyridinium chloride. One alone or two or more of these may be used either singly or as mixed.

The amount of the emulsifier to be used is preferably 0.5 to 15 parts by mass relative to 100 parts by mass of the modified conjugated diene rubber more preferably 1 to 10 parts by mass. When the amount of the emulsifier used is not more than the above-mentioned upper limit, use of any excessive emulsifier can be prevented without having any influence on the stability of the emulsion, and is therefore economically advantageous, and additionally increases adhesion force. When the amount of the emulsifier used is not less than the lower limit, increase in the emulsion particle size can be suppressed and creaming and separation phenomena can be prevented from occurring. From the viewpoint of achieving a stable emulsion, the emulsion particle size is preferably controlled to be 0.1 to 8 μm, more preferably 0.1 to 5 μm, even more preferably 0.1 to 1 μm. For the purpose of enhancing the stability of emulsion, if desired, an alkali substance such as sodium hydroxide, potassium hydroxide or amine may be added for pH control.

The amount of the adhesive component to be adhered is, from the viewpoint of improving the adhesiveness between reinforcing fibers and rubber, preferably 0.01% by mass or more relative to the reinforcing fibers, more preferably 0.1% by mass or more, even more preferably 1% by mass or more, and is, from the viewpoint of the balance between the production cost and the performance, preferably 10% by mass or less, more preferably 5% by mass or less.

From the viewpoint of enhancing adhesiveness to rubber, preferably, the method (I) further includes the following step I-2.

Step I-2: a step of heat-treating the adhesive component-adhered hydrophilic fibers prepared in the step 1-1.

The heat treatment in the step 1-2 is preferably carried out at a treatment temperature of 100 to 200° C. for a treatment time of 0.1 seconds to 2 minutes. The modified conjugated diene rubber contained in the adhesive component has a reactive multiple bond, and therefore the heat treatment in the presence of oxygen is preferably at 200° C. or lower, more preferably 175° C. or lower. When the heat treatment temperature falls within the range, adhesion force can be increased without reducing the reactive multiple bond amount in the modified conjugated diene rubber, and further, degradation of fibers can be prevented to secure good quality without discoloration.

[Method (II)]

The production method for the reinforcing fibers of the present invention may also be the method (II) for producing fibers containing the adhesive component as a part of the raw material thereof.

The other raw material than the adhesive component in the case where the reinforcing fibers contain the adhesive component as a part of the raw material is not specifically limited, and examples thereof include polyvinyl alcohol, polyester, nylon, triacetate, diacetate, polyamide and mixtures thereof, and above all, from the viewpoint of easiness in mixing with the adhesive component and of the strength of the reinforcing fibers, polyvinyl alcohol is preferred.

In the case where the reinforcing fibers contains the adhesive component as a part of a raw material, the content of the adhesive component in the raw material for the fibers is, from the viewpoint of improving the adhesiveness between the reinforcing fibers and rubber, preferably 5% by mass or more, more preferably 10% by mass or more, even more preferably 30% by mass or more, and is, from the viewpoint of the balance between the production cost and the performance, preferably 70% by mass or less, more preferably 65% by mass or less, even more preferably 50% by mass or less.

In the method (II) of producing the fibers containing the adhesive component as a part of the raw material, the production method for the fibers is not specifically limited, and the fibers can be produced according to a production method for ordinary synthetic fibers. For example, a polyvinyl alcohol having a polymerization degree of 1,500 or more and a saponification degree of 99 mol % or more and the above-mentioned adhesive component are dissolved or semi-melted in water or an organic solvent, and spun in a wet process, or a dry process or a dry-wet process to produce the intended fibers.

The reinforcing fibers may contain any other component that the hydrophilic fibers and the adhesive component. The other component includes a crosslinking agent, an acid, a base, an inorganic salt, an organic salt, a pigment, a dye, an antioxidant, a polymerization initiator, and a plasticizer.

The total content of the hydrophilic fibers and the adhesive component in the reinforcing fibers is, from the viewpoint of enhancing the adhesion force to rubber and the reinforcing strength thereof, preferably 80% by mass or more, more preferably 90% by mass or more, even more preferably 95% by mass or more.

<Physical Properties of Reinforcing Fibers>

Preferably, the reinforcing fibers are multifilaments having a single fiber fineness of 0.1 dtex or more and 30 dtex or less. The single fiber fineness may be less than 0.1 dtex, but such multifilaments are difficult to produce industrially, and therefore the single fiber fineness is preferably 0.1 dtex or more. On the other hand, when the single fiber fineness is 30 dtex or less, the surface area of the fibers formed to be reinforcing fibers can be large to be able to enhance adhesiveness to rubber. From these viewpoints, the reinforcing fibers of the present invention are preferably multifilaments having a single fiber fineness of more preferably 0.3 dtex or more, even more preferably 0.5 dtex or more, further more preferably 1 dtex or more, and having a single fiber fineness of more preferably 20 dtex or less, even more preferably 15 dtex or less, further more preferably 10 dtex or less.

Preferably, the reinforcing fibers of the present invention has an initial tensile resistance, as measured according to JIS L 1013:2010, of 60 cN/dtex or more. When the initial tensile resistance of the reinforcing fibers is 60 cN/dtex or more, the reinforcing strength in bonding the reinforcing fibers to rubber enhances. From this viewpoint, the initial tensile resistance is more preferably 100 cN/dtex or more, even more preferably 130 cN/dtex or more, further more preferably 160 cN/dtex or more, and especially more preferably 200 cN/dtex or more. The upper limit of the initial tensile resistance is not specifically limited, but is generally 1,000 cN/dtex or less.

The reinforcing fibers can be used in any arbitrary form and are preferably used in the form of fiber cords, woven fabrics or knitted fabrics that contain the reinforcing fibers at least partly therein, and more preferably in the form of woven fabrics or knitted fabrics that contains the reinforcing fibers at least partly therein. For example, the reinforcing fibers can be used as a knitted fabric in which they adhere to rubber as described hereinunder. In addition, they can also be used as reinforcing fibers to be buried in resin or cement.

[Molded Article]

The molded article of the present invention is not specifically limited so far as it uses the above-mentioned reinforcing fibers. In particular, since the reinforcing fibers has excellent adhesiveness to rubber, they are preferably used in a molded article using the reinforcing fibers and a rubber component (hereinafter also may be referred to as "rubber molded article"). The reinforcing fibers for use in the rubber molded article are, from the viewpoint of rubber form retention, preferably in the form of a woven fabric or a knitted fabric containing the reinforcing fibers at least partly therein, more preferably in the form of a laminate produced by laminating a reinforcing layer of a woven fabric or a knitted fabric that contains the reinforcing fibers at least partly therein, and a rubber layer.

The rubber molded article can be used as tires such as automobile tires, belts such as conveyor belts or timing belts, hoses, and rubber product members such as vibration absorbing rubbers, and is, above all, more preferably used as tires, belts or hoses.

Regarding the automobile tires, for example, the rubber molded article can be used for various members of composite materials formed of reinforcing fibers and a rubber component such as belts, carcass plies, breakers, and bead tapes.

The hoses can be used for the purpose of transporting various fluids in various uses, and are, for example, favorable for fluid transport hoses for automobiles, and are especially favorably used for liquid fuel hoses for automobiles, brake oil hoses for automobiles and refrigerant hoses, more favorably for brake oil hoses for automobiles.

Preferably, the rubber molded article is molded using a rubber composition prepared by blending the above-mentioned reinforcing fibers and a rubber component blended with a blending agent generally used in the rubber industry.

Examples of the rubber component include, though not specifically limited thereto, NR (natural rubber), IR (polyisoprene rubber), BR (polybutadiene rubber), SBR (styrenebutadiene rubber), NBR (nitrile rubber), EPM (ethylenepropylene copolymer rubber), EPDM (ethylene-propylenenon-conjugated diene copolymer rubber), IIR (butyl rubber), halogenobutyl rubber, and CR (chloroprene rubber). Among these, NR, IR, BR, SBR, EPDM, and CR are preferably used, and EPDM is more preferably used. One alone or two or more kinds of these rubber components may be used either singly or as combined. For use for tires, those generally used in the tire industry are used. Above all, natural rubber alone, or a combination of natural rubber and SBR is preferably used. When natural rubber and SBR are combined, the ratio by mass of natural rubber to SBR (natural rubber/SBR) is preferably within a range of 50/50 to 90/10, from the viewpoint of suppressing degradation of physical properties owing to reversion of rubber.

Examples of the natural rubber include natural rubber, and modified natural rubber such as high-purity natural rubber, epoxidated natural rubber, hydroxylated natural rubber, hydrogenated natural rubber and grafted natural rubber that are generally used in the tire industry, for example, TSR (technically specified rubber) and RSS (ribbed smoked sheet) such as SMR (TSR from Malaysia), SIR (TSR from Indonesia), and STR (TSR from Thailand).

As SBR, any ordinary one generally used for tires can be used, and specifically, one having a styrene content of 0.1 to 70% by mass is preferably used, more preferably 5 to 50% by mass, even more preferably 15 to 35% by mass. Also, one having a vinyl content of 0.1 to 60% by mass is preferably used, more preferably 0.1 to 55% by mass.

The weight-average molecular weight (Mw) of SBR is preferably 100,000 to 2,500,000, more preferably 150,000 to 2,000,000, even more preferably 200,000 to 1,500,000. When Mw falls within the range, both workability and mechanical strength can be satisfied. The weight-average molecular weight of SBR is a polystyrene-equivalent weight-average molecular weight thereof measured through gel permeation chromatography (GPC).

As SBR, a modified SBR prepared by introducing a functional group into SBR within a range not interfering with the effect of the present invention can also be used. Examples of the functional group include an amino group, an alkoxysilyl group, a hydroxy group, an epoxy group and a carboxy group.

The rubber composition may further contain a filler in addition to the rubber component. Examples of the filler include inorganic fillers such as carbon black, silica, clay, mica, calcium carbonate, magnesium hydroxide, aluminum hydroxide, barium sulfate, titanium oxide, glass fibers, fibrous fillers, and glass balloons; and organic fillers such as resin particles, wood powder, and cork powder. Contained in the rubber composition, the filler can improve physical properties of the composition such as mechanical strength, heat resistance and weather resistance thereof, can control the hardness thereof, and can increase the amount of rubber.

From the viewpoint of improving physical properties, for example, increasing mechanical strength, carbon black and silica are preferred among the above-mentioned fillers.

Examples of the carbon black include furnace black, channel black, thermal black, acetylene black, and Ketjen black. From the viewpoint of increasing crosslinking speed and mechanical strength, furnace black is preferred among these carbon blacks.

The average particle size of the carbon black is preferably 5 to 100 nm, more preferably 5 to 80 nm, even more preferably 5 to 70 nm. The average particle size of the carbon black can be determined by measuring the diameter of each particle with a transmission electron microscope and calculating the average value of the resultant data.

The silica includes wet-process silica (hydrous silicic acid), dry-process silica (silicic anhydride), calcium silicate, and aluminum silicate. Among these types of silica, wet-process silica is preferred.

The average particle size of the silica is preferably 0.5 to 200 nm, more preferably 5 to 150 nm, even more preferably 10 to 100 nm.

The average particle size of the silica can be determined by measuring the diameter of each particle with a transmission electron microscope and calculating the average value of the resultant data.

In the rubber composition, preferably, the filler content is 20 to 150 parts by mass relative to 100 parts by mass of the rubber component, more preferably 25 to 130 parts by mass, even more preferably 25 to 110 parts by mass.

In the case where any other filler than silica and carbon black is used, the content thereof is preferably 20 to 120 parts by mass relative to 100 parts by mass of the rubber component, more preferably 20 to 90 parts by mass, even more preferably 20 to 80 parts by mass.

One alone or two or more kinds of these fillers can be used either singly or as combined.

The rubber composition may further contain a crosslinking agent for crosslinking the rubber component therein. Examples of the crosslinking agent include sulfur, sulfur compounds, oxygen, organic peroxides, phenolic resins, amino resins, quinone and quinone dioxime derivatives, halogen compounds, aldehyde compounds, alcohol compounds, epoxy compounds, metal halide compounds, organic metal halide compounds, and silane compounds. One alone or two or more kinds of these crosslinking agents may be used either singly or as combined. From the viewpoint of mechanical properties of the crosslinked product, the crosslinking agent is contained generally in an amount of 0.1 to 10 parts by mass relative to 100 parts by mass of the rubber component, more preferably 0.5 to 10 parts by mass, even more preferably 0.8 to 5 parts by mass.

In the case where the rubber composition contains sulfur or a sulfur compound as the crosslinking agent for crosslinking (vulcanizing) the rubber component, the composition may further contain a vulcanization accelerator. Examples of the vulcanization accelerator include guanidine compounds, sulfenamide compounds, thiazole compounds, thiuram compounds, thiourea compounds, dithiocarbamate compounds, aldehyde-amine compounds, aldehyde-ammonia compounds, imidazoline compounds, and xanthate compounds. One alone or two or more kinds of these vulcanization accelerators may be used either singly or as combined. The vulcanization accelerator may be contained generally in an amount of 0.1 to 15 parts by mass relative to 100 parts by mass of the rubber component, preferably 0.1 to 10 parts by mass.

In the case where the rubber composition contains sulfur or a sulfur compound as the crosslinking agent for crosslinking (vulcanizing) the rubber component, the composition may further contain a vulcanization aid. Examples of the vulcanization aid include fatty acids such as stearic acid, metal oxides such as zinc oxide, and fatty acid metal salts such as zinc stearate. One alone or two or more kinds of these vulcanization aids may be used either singly or as combined. The vulcanization aid may be contained generally in an amount of 0.1 to 15 parts by mass relative to 100 parts by mass of the rubber component, preferably 1 to 10 parts by mass.

In the case where the rubber composition contains silica as a filler, preferably, the composition further contains a silane coupling agent. Examples of the silane coupling agent include sulfide compounds, mercapto compounds, vinyl compounds, amino compounds, glycidoxy compounds, nitro compounds, and chlorine compounds.

One alone or two or more kinds of these silane coupling agents may be used either singly or as combined. The silane coupling agent may be contained generally in an amount of 0.1 to 30 parts by mass relative to 100 parts by mass of silica, preferably 0.5 to 20 parts by mass, more preferably 1 to 15 parts by mass. When the content of the silane coupling agent falls within the range, dispersibility, coupling effect and reinforcing performance improve.

The rubber composition may optionally contain, as a softening agent, a process oil such as silicone oil, aroma oil, TDAE (treated distilled aromatic extract), MES (mild extracted solvate), RAE (residual aromatic extract), paraffin oil, and naphthene oil, and a resin component such as aliphatic hydrocarbon resin, alicyclic hydrocarbon resin, C9 resin, rosin resin, coumarone-indene resin, and phenolic resin, within a range not interfering with the effect of the present invention and for the purpose of improving workability and fluidity. In the case where the rubber composition contains the process oil as a softening agent, the content thereof is preferably not more than 50 parts by mass relative to 100 parts by mass of the rubber component.

The rubber composition may optionally contain additives such as an antiaging agent, a wax, an antioxidant, a lubricant, a light stabilizer, a scorching inhibitor, a working aid, a colorant such as pigment or dye, a flame retardant, an antistatic agent, a delustering agent, an antiblocking agent, a UV absorbent, a mold release agent, a foaming agent, an antimicrobial agent, a mildew-proofing agent, and a fragrance, within a range not interfering with the effect of the present invention and for the purpose of improving weather resistance, heat resistance and oxidation resistance. Examples of the antioxidant include hindered phenol compounds, phosphorus compounds, lactone compounds and hydroxy compounds. Examples of the antiaging agent include amine-ketone compounds, imidazole compounds, amine compounds, phenolic compounds, sulfur compounds and phosphorus compounds. One alone or two or more kinds of these additives may be used either singly or as combined.

Regarding the production method for the rubber molded article, for example, the reinforcing fibers are buried in the above-mentioned unvulcanized rubber composition, and then the rubber composition is vulcanized to give a molded article in which the hydrophilic fibers and the rubber component bond via the adhesive component therein.

An example of the brake oil hoses for automobiles is one having an inner rubber layer and an outer rubber layer, in which one or two reinforcing layers containing the reinforcing fibers are arranged between the inner rubber layer and the outer rubber layer.

The rubber component to constitute the inner rubber layer and the outer rubber layer includes those mentioned hereinabove. Above all, the rubber component to constitute the inner rubber layer includes EPDM and SBR, and the rubber component to constitute the outer rubber layer includes EPDM and CR. The reinforcing layer may be formed by knitting and braiding the reinforcing fibers.

Regarding the production method for the brake oil hoses, a reinforcing layer (first reinforcing layer) formed by knitting and braiding the reinforcing fibers is formed on the outer surface of the inner rubber layer. In the case where two reinforcing layers are formed, an intermediate rubber layer is further formed on the outer surface of the first reinforcing layer, and another reinforcing layer (second reinforcing layer) formed by knitting and braiding the reinforcing fibers may be formed on the outer surface of the intermediate rubber layer. With that, an outer rubber layer is formed on the outer surface of the reinforcing layer (first reinforcing layer or second reinforcing layer), and vulcanized to give the intended brake oil hose.

The vulcanization temperature can be appropriately selected depending on the kind of the constituent material for each layer of the brake oil hose, and is, from the viewpoint of improving the adhesion force between rubber and the reinforcing fibers, preferably 200° C. or lower.

EXAMPLES

Hereinunder the present invention is described further specifically with reference to Examples, but the present invention is not whatsoever restricted by these Examples.
<Production of Modified Conjugated Diene Rubber>

Production of modified conjugated diene rubber having monomer unit represented by the following formula (1a):

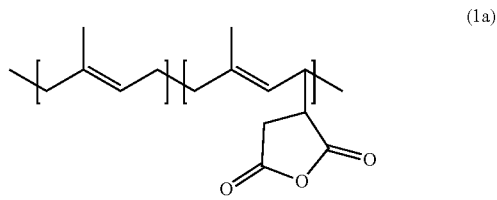

(1a)

Production Example 1: Production of Modified Conjugated Diene Rubber (A-1)

A fully-dried 5-L autoclave was purged with nitrogen, then 1200 g of hexane and 26.2 g of n-butyl lithium (17 mass % hexane solution) were put thereinto, heated up to 50° C., and then with stirring and controlling the polymerization temperature so as to be at 50° C., 1200 g of isoprene was sequentially added and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried in vacuum at 70° C. for 24 hours to give an unmodified liquid polyisoprene (A'-1).

Subsequently, in a 1-L autoclave purged with nitrogen, 500 g of the resultant unmodified liquid polyisoprene (A'-1) was put, and 25 g of maleic anhydride and 0.5 g of butylated hydroxytoluene (BHT) were added, and reacted at 170° C. for 15 hours to give a maleic anhydride-modified liquid polyisoprene (A-1).

Production Example 2: Production of Modified Conjugated Diene Rubber (A-2)

In a 1-L autoclave purged with nitrogen, 500 g of an unmodified liquid polyisoprene (A'-1) produced according to the same process as in Production Example 1 was put, and 7.5 g of maleic anhydride and 0.5 g of butylated hydroxytoluene (BHT) were added, and reacted at 170° C. for 15 hours to give a maleic anhydride-modified liquid polyisoprene (A-2).

Production Example 3: Production of Modified Conjugated Diene Rubber (A-3)

In a 1-L autoclave purged with nitrogen, 500 g of an unmodified liquid polyisoprene (A'-1) produced according to the same process as in Production Example 1 was put, and 50 g of maleic anhydride and 0.5 g of butylated hydroxytoluene (BHT) were added, and reacted at 170° C. for 15 hours to give a maleic anhydride-modified liquid polyisoprene (A-3).

Production of modified conjugated diene rubber having monomer unit represented by the following formula (1b):

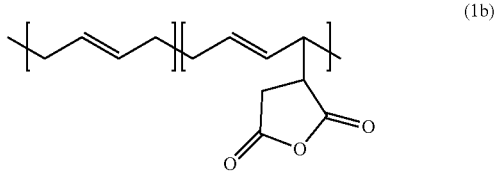

(1b)

Production Example 4: Production of Modified Conjugated Diene Rubber (A-4)

A fully-dried 5-L autoclave was purged with nitrogen, then 1260 g of hexane and 36.3 g of n-butyl lithium (17 mass % hexane solution) were put thereinto, heated up to 50° C., and then with stirring and controlling the polymerization temperature so as to be at 50° C., 1260 g of butadiene was sequentially added and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried in vacuum at 70° C. for 24 hours to give an unmodified liquid polybutadiene (A'-2).

Subsequently, in a 1-L autoclave purged with nitrogen, 500 g of the resultant unmodified liquid polybutadiene (A'-2) was put, and 25 g of maleic anhydride and 0.5 g of N-phenyl-N'-(1,3-dimethylbutyl)-p-phenylenediamine (trade name "Nocrac 6C", from Ouchi Shinko Chemical Industrial Co., Ltd.) were added, and reacted at 170° C. for 24 hours to give a maleic anhydride-modified liquid polybutadiene (A-4).

Production of Modified Conjugated Diene Rubber Having Monomer Unit Represented by the Following Formula (1c):

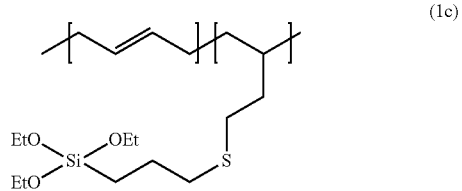

(1c)

Production Example 5: Production of Modified Conjugated Diene Rubber (A-5)

In a 1-L autoclave purged with nitrogen, 500 g of an unmodified liquid polybutadiene (A'-2) produced according to the same process as in Production Example 3 was put, and 37 g of 3-mercaptopropyltriethoxysilane and 0.5 g of butylated hydroxytoluene (BHT) were added, and reacted at 105° C. for 8 hours to give a triethoxysilane-modified liquid polybutadiene (A-5).

Production Example 6: Production of Modified Conjugated Diene Rubber (A-6) Having Structural Unit Derived from β-Farnesene Monomer A fully-dried 5-L autoclave was purged with nitrogen, then 1200 g of hexane and 5.0 g of n-butyl lithium (17 mass % hexane solution) were put thereinto, heated up to 50° C., and then with stirring and controlling the polymerization temperature so as to be at 50° C., 1200 g of β-farnesene was sequentially added and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried in vacuum at 70° C. for 24 hours to give an unmodified liquid polyfarnesene (A'-3).

Subsequently, in a 1-L autoclave purged with nitrogen, 500 g of the resultant unmodified liquid polyfarnesene (A'-3) was put, and 25 g of maleic anhydride and 0.5 g of butylated hydroxytoluene (BHT) were added, and reacted at 170° C. for 24 hours to give a maleic anhydride-modified liquid polyfarnesene (A-6).

Production Example 7: Production of Modified Conjugated Diene Rubber (A-7) Having Structural Units Derived from β-Farnesene Monomer and Butadiene Monomer A fully-dried 5-L autoclave was purged with nitrogen, then 1200 g of hexane and 32.8 g of sec-butyl lithium (10.5 mass % cyclohexane solution) were put thereinto, heated up to 50° C., and then with stirring and controlling the polymerization temperature so as to be at 50° C., 1430 g of a previously-prepared mixture of β-farnesene and butadiene (prepared by mixing 858 g of β-farnesene and 527 g of butadiene in a cylinder tank) was added at 12.5 ml/min and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried in vacuum at 70° C. for 24 hours to give an unmodified liquid farnesene-butadiene random copolymer (A'-4).

Subsequently, in a 1-L autoclave purged with nitrogen, 500 g of the resultant unmodified liquid farnesene-butadiene random copolymer (A'-4) was put, and 25 g of maleic anhydride and 0.5 g of butylated hydroxytoluene (BHT) were added, and reacted at 170° C. for 24 hours to give a maleic anhydride-modified liquid farnesene-butadiene random copolymer (A-7).

Measurement methods and calculation methods for the physical properties of modified conjugated diene rubbers are as follows. The results are shown in Table 1.

(Measurement Method for Weight-Average Molecular Weight, Number-Average Molecular Weight and Molecular Weight Distribution)

Mw, Mn and Mw/Mn of the modified conjugated diene rubber were determined as standard polystyrene-equivalent values through GPC (gel permeation chromatography). The apparatus and the condition for measurement are as follows.

Apparatus: GPC apparatus "GPC8020" from Tosoh Corporation
Separation column: "TSKgel G4000HXL" from Tosoh Corporation
Detector: "RI-8020" from Tosoh Corporation
Eluent: Tetrahydrofuran
Eluent flow rate: 1.0 ml/min
Sample concentration: 5 mg/10 ml
Column temperature: 40° C.

(Measurement Method for Melt Viscosity)

The melt viscosity at 38° C. of the modified conjugated diene rubber was measured using a Brookfield viscometer (from Brookfield Engineering Labs. Inc.).

(Average Number of Hydrogen-Bonding Functional Groups Per Molecule)

The average number of the hydrogen-bonding functional groups per molecule of the modified conjugated diene rubber was calculated from the equivalent (g/eq) of the hydrogen-bonding functional group of the modified conjugated diene rubber and the styrene-equivalent number-average molecular weight Mn thereof, according to the following expression.

Average number of hydrogen-bonding functional groups per molecule=[(number-average molecular weight (Mn))/(molecular weight of styrene unit)×(average molecular weight of conjugated diene and any other optional monomer unit than conjugated diene)]/(equivalent of hydrogen-bonding functional group)

The method for calculating the equivalent of the hydrogen-bonding functional group can be appropriately selected depending on the kind of the hydrogen-bonding functional group.

The equivalent of the hydrogen-bonding functional group in calculation of the average number of the hydrogen-bonding functional groups per molecule of a triethoxysilane-modified conjugated diene rubber was calculated from the integrated value ratio of the signal derived from the hydrogen-bonding functional group to the signal derived from the polymer main chain, in $^1$H-NMR or $^{13}$C-NMR. The signal derived from the hydrogen-bonding functional group means a signal derived from an alkoxy group in the case of a triethoxysilane-modified conjugated diene rubber.

The average number of the hydrogen-bonding functional groups per molecule of a maleic anhydride-modified conjugated diene rubber was calculated by determining the acid value of the maleic anhydride-modified conjugated diene rubber and calculating the equivalent (g/eq) of the hydrogen-bonding functional group from the acid value.

A modified sample was washed four times with methanol (5 mL per gram of the sample) to remove impurities such as antioxidant, and then the sample was dried under reduced pressure at 80° C. for 12 hours. 180 mL of toluene and 20 mL of ethanol were added to 3 g of the modified sample to dissolve the sample therein, and then this was subjected to neutralization titration with an ethanol solution of 0.1 N potassium hydroxide to determine the acid value thereof according to the following expression.

Acid Value(mgKOH/g)=$(A-B) \times F \times 5.611/S$

A: Amount (mL) of ethanol solution of 0.1 N potassium hydroxide needed for neutralization.
B: Amount (mL) of ethanol solution of 0.1 N potassium hydroxide in sample-free blank.
F: Titer of ethanol solution of 0.1 N potassium hydroxide.
S: Mass (g) of weighed sample.

From the acid value, the mass of the hydrogen-bonding functional group contained in 1 g of the maleic anhydride-modified conjugated diene rubber was calculated according to the following expression, and further the mass (polymer chain mass) except the functional group contained in 1 g of the maleic anhydride-modified conjugated diene rubber was calculated. With that, the equivalent of the hydrogen-bonding functional group (g/eq) was calculated according to the following expression.

[Mass of hydrogen-bonding functional group per gram]=[acid value]/[56.11]×[molecular weight of hydrogen-bonding functional group]/1000

[Mass of polymer main chain per gram]=1−[mass of hydrogen-bonding functional group per gram]

[Equivalent of hydrogen-bonding functional group]=[ass of polymer main chain per gram]/'[mass of hydrogen-bonding functional group per gram]/[molecular weight of hydrogen-bonding functional group])

(Amount of Modifying Compound Added)

The amount of the modifying compound (part by mass) added to 100 parts by mass of an unmodified conjugated diene rubber was calculated according to the following expression.

[Amount of modifying compound added]=[mass of hydrogen-bonding functional group per gram]/[mass of polymer main chain per gram]×100

TABLE 1

| Modified Conjugated Diene Rubber | | Hydrogen-Bonding Functional Group | Mw (×10³) | Mn (×10³) | Mw/Mn | Melt Viscosity (38° C.) (Pa · s) | Average Number of Hydrogen-Bonding Functional Groups | Amount of Modifying Compound Added (part by mass) |
|---|---|---|---|---|---|---|---|---|
| A'-1 | (unmodified polyisoprene) | — | 32 | 28 | 1.1 | 74 | — | — |
| A'-2 | (unmodified polybutadiene) | — | 27 | 26 | 1.0 | 40 | — | — |
| A'-3 | (unmodified polyfarnesene) | — | 125 | 113 | 1.1 | 80 | — | — |
| A'-4 | (unmodified farnesene/butadiene random copolymer) | — | 49 | 48 | 1.0 | 57 | — | — |
| A-1 | modified polyisoprene | maleic anhydride group | 34 | 30 | 1.1 | 198 | 10 | 5.0 |
| A-2 | modified polyisoprene | maleic anhydride group | 35 | 30 | 1.2 | 200 | 3 | 1.5 |
| A-3 | modified polyisoprene | maleic anhydride group | 35 | 30 | 1.2 | 618 | 20 | 10 |
| A-4 | modified polybutadiene | maleic anhydride group | 29 | 27 | 1.1 | 95 | 7 | 5.0 |
| A-5 | modified polybutadiene | triethoxysilyl group | 40 | 31 | 1.3 | 85 | 4 | 7.4 |

TABLE 1-continued

| Modified Conjugated Diene Rubber | Hydrogen· Bonding Functional Group | Mw (×10³) | Mn (×10³) | Mw/Mn | Melt Viscosity (38° C.) (Pa·s) | Average Number of Hydrogen· Bonding Functional Groups | Amount of Modifying Compound Added (part by mass) |
|---|---|---|---|---|---|---|---|
| A-6 modified polyfarnesene | maleic anhydride group | 166 | 127 | 1.3 | 291 | 109 | 5.0 |
| A-7 modified farnesene/butadiene random copolymer | maleic anhydride group | 60 | 53 | 1.1 | 176 | 23 | 5 |

<Preparation of Modified Conjugated Diene Rubber Emulsion>

Preparation Example 1: Preparation of Emulsion (E-1) of Modified Conjugated Diene Rubber (A-1)

15 g of an emulsifier (polyoxyethylene alkyl (C=12 to 15) ether phosphate) (trade name "Phosphanol RS-710" from TOHO Chemical Industry Co., Ltd.) was added to 250 g of the modified conjugated diene rubber (A-1) and stirred for 20 minutes. Subsequently, with stirring, 180 g of an aqueous solution of 0.7 mol/L sodium hydroxide was added little by little. After a predetermined amount of water was added, this was stirred for 20 minutes to give an emulsion (E-1) of the modified conjugated diene rubber (A-1).

Preparation Example 2: Preparation of Emulsion (E-2) of Modified Conjugated Diene Rubber (A-2)

15 g of an emulsifier (polyoxyethylene alkyl (C=12 to 15) ether phosphate) (trade name "Phosphanol RS-710" from TOHO Chemical Industry Co., Ltd.) was added to 250 g of the modified conjugated diene rubber (A-2) and stirred for 20 minutes. Subsequently, with stirring, 56 g of an aqueous solution of 0.7 mol/L sodium hydroxide was added little by little, and further 124 g of water was added little by little. After a predetermined amount of water was added, this was stirred for 20 minutes to give an emulsion (E-2) of the modified conjugated diene rubber (A-2).

Preparation Example 3: Preparation of Emulsion (E-3) of Modified Conjugated Diene Rubber (A-3)

15 g of an emulsifier (polyoxyethylene alkyl (C=12 to 15) ether phosphate) (trade name "Phosphanol RS-710" from TOHO Chemical Industry Co., Ltd.) was added to 250 g of the modified conjugated diene rubber (A-3) and stirred for 20 minutes. Subsequently, with stirring, 180 g of an aqueous solution of 1.4 mol/L sodium hydroxide was added little by little. After a predetermined amount of water was added, this was stirred for 20 minutes to give an emulsion (E-3) of the modified conjugated diene rubber (A-3).

Preparation Example 4: Preparation of Emulsion (E-4) of Modified Conjugated Diene Rubber (A-4)

15 g of an emulsifier (polyoxyethylene alkyl (C=12 to 15) ether phosphate) (trade name "Phosphanol RS-710" from TOHO Chemical Industry Co., Ltd.) was added to 250 g of the modified conjugated diene rubber (A-4) and stirred for 20 minutes. Subsequently, with stirring, 180 g of an aqueous solution of 0.7 mol/L sodium hydroxide was added little by little. After a predetermined amount of water was added, this was stirred for 20 minutes to give an emulsion (E-4) of the modified conjugated diene rubber (A-4).

Preparation Example 5: Preparation of Emulsion (E-5) of Modified Conjugated Diene Rubber (A-5)

15 g of an emulsifier (polyoxyethylene alkyl (C=12 to 15) ether phosphate) (trade name "Phosphanol RS-710" from TOHO Chemical Industry Co., Ltd.) was added to 250 g of the modified conjugated diene rubber (A-5) and stirred for 20 minutes. Subsequently, with stirring, 21 g of an aqueous solution of 1 mol/L sodium hydroxide was added little by little, and further 159 g of water was added little by little. After a predetermined amount of water was added, this was stirred for 20 minutes to give an emulsion (E-5) of the modified conjugated diene rubber (A-5).

Preparation Example 6: Preparation of Emulsion (E-6) of Modified Conjugated Diene Rubber (A-6)

15 g of an emulsifier (polyoxyethylene alkyl (C=12 to 15) ether phosphate) (trade name "Phosphanol RS-710" from TOHO Chemical Industry Co., Ltd.) was added to 250 g of the modified conjugated diene rubber (A-6) and stirred for 20 minutes. Subsequently, with stirring, 180 g of an aqueous solution of 0.7 mol/L sodium hydroxide was added little by little. After a predetermined amount of water was added, this was stirred for 20 minutes to give an emulsion (E-6) of the modified conjugated diene rubber (A-6).

Preparation Example 7: Preparation of Emulsion (E-7) of Modified Conjugated Diene Rubber (A-7)

15 g of an emulsifier (polyoxyethylene alkyl (C=12 to 15) ether phosphate) (trade name "Phosphanol RS-710" from TOHO Chemical Industry Co., Ltd.) was added to 250 g of the modified conjugated diene rubber (A-7) and stirred for 20 minutes. Subsequently, with stirring, 180 g of an aqueous solution of 0.7 mol/L sodium hydroxide was added little by little. After a predetermined amount of water was added, this was stirred for 20 minutes to give an emulsion (E-7) of the modified conjugated diene rubber (A-7).

<Measurement of Adhering Amount of Adhesive Component>

The adhering amount of the adhesive component was measured according to the following measurement method.

About 10 g of reinforcing fibers were taken as a sample, and the mass X thereof was measured. The adhesive component was extracted out from the sample, and the extracted mass Y was measured. For extraction, toluene was used as a solvent, and the sample was extracted for 3 hours using a Soxhlet extractor. The adhering amount of the adhesive component was calculated according to the following expression.

Amount of adhesive component (% by mass) adhering to reinforcing fibers=$(Y/X)\times100$ In addition, the content (% by mass) of the modified conjugated diene rubber in the adhesive component was calculated from the mass ratio of the modified conjugated diene rubber in the solid content in the adhesive component.

Example 1

As Example 1, reinforcing fibers having an adhesive layer of an adhesive component in at least a part of the surfaces of hydrophilic fibers were produced and evaluated as follows.

An adhesive component containing the modified conjugated diene rubber (A-1) produced in the manner as above was dissolved in tetrahydrofuran so as to have a solid concentration of 4% by mass. As hydrophilic fibers, vinylon fibers of polyvinyl alcohol fibers ("Kuralon 1239" from Kuraray Co., Ltd., total fineness 1330 dtex, single fiber fineness 6.65 dtex) were dipped in the solution, then drawn out and dried in draft. The vinylon adhered with the adhesive component in the manner as above was twisted at a twist count of 80 T/m to give a fiber cord.

Examples 2 to 8

As Examples 2 to 8, reinforcing fibers having an adhesive layer of an adhesive component in at least a part of the surfaces of hydrophilic fibers were produced and evaluated as follows.

An adhesive component containing any of the emulsions (E-1) to (E-7) of a modified conjugated diene rubber produced in the manner as above was dispersed in water so as to have a solid concentration of 4% by mass. Vinylon fibers ("Kuralon 1239" from Kuraray Co., Ltd., total fineness 1330 dtex, single fiber fineness 6.65 dtex) were dipped in the dispersion, and then squeezed with rollers. Next, the resultant fibers were dried at 120° C. for 30 seconds, and then heat-treated at 170° C. for 30 seconds. The vinylon adhered with the adhesive component in the manner as above was twisted at a twist count of 80 T/m to give a fiber cord.

Comparative Example 1

In Comparative Example 1, a fiber cord was produced according to the same method as in Example 1 except that the unmodified conjugated diene rubber (A'-1) was used as the adhesive component.

Comparative Example 2

In Comparative Example 2, a fiber cord was produced according to the same method as in Example 2 except that hydrophobic polyester fibers, PET fibers ("702C" from Toray Co., Ltd., total fineness 1670 dtex, single fiber fineness 5.80 dtex) were used in place of the vinylon fibers.

Reference Example 1

In Reference Example 1, vinylon fibers ("Kuralon 1239" from Kuraray Co., Ltd., total fineness 1330 dtex, single fiber fineness 6.65 dtex) were treated with RFL in a known manner so as to have an adhesion amount of 3.0% by mass. The vinylon adhered with the adhesive component in the manner as above was twisted at a twist count of 80 T/m to give a fiber cord. The RFL liquid used here was prepared according to the following method.

<Preparation of RFL Liquid>

| Liquid A | |
|---|---|
| Water: | 300 parts by mass |
| Resorcinol: | 22 parts by mass |
| Formaldehyde (effective amount 37% by mass): | 33 parts by mass |
| Aqueous solution of sodium hydroxide (effective amount 10% by mass): | 7 parts by mass |

The liquid A was aged at a temperature of 25° C. for 6 hours.

| Liquid B | |
|---|---|
| SBR latex (effective amount 40% by mass): | 43 parts by mass |
| Vinylpyridine-modified SBR latex (effective amount 40% by mass): | 244 parts by mass |

The liquid B was mixed with the aged liquid A, and aged at a temperature of 25° C. for 16 hours to prepare an RFL liquid. For controlling the adhesion amount of the liquid to the fibers, the liquid was diluted by twice with water after the above operation.

<Production of Evaluation Sheet>

The fiber cords produced in the above Examples, Comparative Examples and Reference Example were individually aligned and fixed on a masking tape like a bamboo curtain thereon in such a manner that the fiber cords could not overlap with each other. This was overlaid on an unvulcanized rubber composition containing EPDM rubber ("Esprene 501A" from Sumitomo Chemical Co., Ltd.) as the main ingredient and separately prepared according to the formulation mentioned below using EPDM rubber (hereinafter this may also be referred to as "EPDM unvulcanized rubber") (width 25.4 mm, length 240 mm). (The length of the overlapped part of the fiber cord and the EPDM unvulcanized rubber was 190 mm.) Next, this was vulcanized by pressing at 150° C. and under the pressure of 20 kg/cm² for 30 minutes to produce an evaluation sheet.

<Blending Formulation of EPDM Unvulcanized Rubber>

| | |
|---|---|
| EPDM rubber: | 100 part by mass |
| Filler (carbon black): | 60 parts by mass |
| Softening agent (paraffin-based process oil): | 20 parts by mass |
| Crosslinking agent (sulfur powder): | 1.5 parts by mass |
| Vulcanization aid (two kinds of zinc oxide, stearic acid): | 6 parts by mass |
| Vulcanization accelerator (thiazole-based, thiuram-based): | 1.5 parts by mass |

<Measurement of Rubber Adhesion Force>

In the resultant evaluation sheet, the fiber cord was peeled from the rubber in a mode of T-type peel, and the force (N/25.4 mm) needed for the peel was measured to be a rubber adhesion force. The results are shown in Table 2.

Regarding the evaluation results of the rubber adhesion force, a larger value means a higher adhesion force between reinforcing fibers and rubber.

<Measurement of Initial Tensile Resistance>

Using a measuring instrument (Instron 3365), the initial tensile resistance of the resultant evaluation sheet was measured according to JIS L 1013:2010. In the peel test, the sheet was moved by 200 mm at a peel speed of 50 mm/min to peel the fiber cord from the rubber.

Among the large number of peaks appearing in a range, from which 10 mm from the initial peak appearing on the chart and 10 mm from the last sheet were removed, the highest 5 points and the lowest 5 points were taken out, and averaged to give an average value indicating the initial tensile resistance between fibers and rubber. The peak data were collected from those separating by 2 mm or more from each other. The results are shown in Table 2. Regarding the evaluation results of the initial tensile resistance, a larger value means a higher reinforcing strength in adhering reinforcing fibers and rubber.

Example 10

In Example 10, a fiber cord was produced according to the same method as in Example 1, except that polyester fibers, PET fibers ("702C" from Toray Co., Ltd., total fineness 1670 dtex, single fiber fineness 5.80 dtex) that had been processed for hydrophilization as mentioned below were used as hydrophilic fibers.

Comparative Example 3

In Comparative Example 3, a fiber cord was produced according to the same method as in Comparative Example 1, except that regenerated cellulose fibers, rayon fibers ("Cordenka 700" from Cordenka Corporation, total fineness 1840 dtex, single fiber fineness 1.84 dtex) were used as hydrophilic fibers in place of vinylon fibers.

Comparative Example 4

In Comparative Example 4, a fiber cord was produced according to the same method as in Comparative Example 1, except that polyester fibers, PET fibers ("702C" from Toray Co., Ltd., total fineness 1670 dtex, single fiber fineness 5.80 dtex) that had been processed for hydrophilization as mentioned below were used as hydrophilic fibers.

TABLE 2

| | | Adhesive Component | | Evaluation of Reinforcing Fibers | |
|---|---|---|---|---|---|
| | | | Content of Modified | | |
| | | Adhesion | Conjugated Diene | | |
| | | Amount | Rubber in Adhesive | Rubber Adhesion | Initial Tensile |
| Hydrophilic | | (mass | Component | Force | Resistance |
| Fibers | Kind | %) | (mass %) | (N/25.4 mm) | (cN/dtex) |
| Example 1 | vinylon | A-1 | 3.1 | 100 | 35 | 210 |
| Example 2 | vinylon | E-1 | 3.0 | 92.6 | 34 | 201 |
| Example 3 | vinylon | E-2 | 3.4 | 93.8 | 25 | 204 |
| Example 4 | vinylon | E-3 | 3.8 | 90.8 | 33 | 207 |
| Example 5 | vinylon | E-4 | 3.2 | 92.6 | 36 | 208 |
| Example 6 | vinylon | E-5 | 2.9 | 94.0 | 30 | 198 |
| Example 7 | vinylon | E-6 | 3.2 | 92.6 | 28 | 199 |
| Example 8 | vinylon | E-7 | 2.7 | 92.6 | 27 | 212 |
| Comparative Example 1 | vinylon | A'-1 | 3.1 | 0 | 9 | 202 |
| Comparative Example 2 | (PET) | E-1 | 3.0 | 92.6 | 7 | 76 |
| Reference Example | vinylon | (RFL) | 3.0 | 0 | 26 | 206 |

Example 9

In Example 9, a fiber cord was produced according to the same method as in Example 1, except that regenerated cellulose fibers, rayon fibers ("Cordenka 700" from Cordenka Corporation, total fineness 1840 dtex, single fiber fineness 1.84 dtex) were used as hydrophilic fibers in place of vinylon fibers.

Reference Example 2

In Reference Example 2, a fiber cord was produced according to the same method as in Reference Example 1, except that regenerated cellulose fibers, rayon fibers ("Cordenka 700" from Cordenka Corporation, total fineness 1840 dtex) were used as hydrophilic fibers in place of vinylon fibers.

Reference Example 3

In Reference Example 3, a fiber cord was produced according to the same method as in Reference Example 1, except that polyester fibers, PET fibers ("702C" from Toray Co., Ltd., total fineness 1670 dtex, single fiber fineness 5.80 dtex) that had been processed for hydrophilization as mentioned below were used as hydrophilic fibers.

<Hydrophilization Treatment>

Polyester fibers, PET fibers ("702C" from Toray Co., Ltd., total fineness 1670 dtex, single fiber fineness 5.80 dtex) were dipped in an aqueous solution prepared to have the following composition, and then squeezed with rollers. Next, the resultant fibers were dried at 130° C. for 60 seconds, then further heat-treated at 240° C. for 60 seconds and rolled up to give hydrophilized PET fibers.

<Composition of Hydrophilizing Agent>

| | |
|---|---|
| Water: | 96.96 parts by mass |
| Meikanote DM-3031 CONC: | 22 parts by mass |
| Denacol EX-614B: | 7 parts by mass |

The hydrophilizing agent was prepared using a blocked isocyanate and an epoxy resin. As the blocked isocyanate, "Meikanote DM-3031 CONC" from Meisei Chemical Works, Ltd. was used, and as the epoxy resin, "Denacol EX-614B" from Nagase ChemteX Corporation was used.

<Measurement of Rubber Adhesion Force and Initial Tensile Resistance>

The fiber cords produced in Examples 9 and 10, Comparative Examples 3 and 4, and Reference Examples 2 and 3 were tested according to the same methods as above to measure and evaluate the rubber adhesion force and the initial tensile resistance. The results are shown in Table 3.

TABLE 3

| | Adhesive Component | | | Evaluation of Reinforcing Fibers | |
|---|---|---|---|---|---|
| | Hydrophilic Fibers | Kind | Adhesion Amount (mass %) | Content of Modified Conjugated Diene Rubber in Adhesive Component (mass %) | Rubber Adhesion Force (N/25.4 mm) | Initial Tensile Resistance (cN/dtex) |
| Example 9 | rayon | A-1 | 3.5 | 100 | 72 | 111 |
| Example 10 | hydrophilized PET | A-1 | 3.4 | 100 | 100 | 77 |
| Comparative Example 3 | rayon | A'-1 | 3.5 | 0 | 8 | 112 |
| Comparative Example 4 | hydrophilized PET | A'-1 | 3.1 | 0 | 7 | 78 |
| Reference Example 2 | rayon | (RFL) | 3.0 | 0 | 65 | 112 |
| Reference Example 3 | hydrophilized PET | (RFL) | 3.0 | 0 | 79 | 78 |

As obvious from the results of Examples and Comparative Examples, the reinforcing fibers of the present invention can be reinforcing fibers excellent in adhesiveness to rubber, without using an adhesive agent that contains a resorcinol-formalin resin and a rubber late as main ingredients.

The invention claimed is:

1. Reinforcing fibers, comprising:
hydrophilic fibers and
an adhesive component,
wherein:
surfaces of the hydrophilic fibers are at least partially covered with the adhesive component,
the adhesive component comprises a modified conjugated diene rubber having a hydrogen-bonding functional group in a part of the modified conjugated diene rubber, and an emulsifier,
the number of the hydrogen-bonding functional groups in the modified conjugated diene rubber is from 2 to 150 per molecule on average,
a melt viscosity measured at 38° C. of the modified conjugated diene rubber is from 0.1 to 4,000 Pa·s, and
the number-average molecular weight (Mn) of the modified conjugated diene rubber is at least 20,000.

2. The reinforcing fibers according to claim 1, wherein the hydrophilic fibers are at least one selected from the group consisting of polyvinyl alcohol fibers, regenerated cellulose fibers, and fibers prepared by hydrophilizing surfaces of hydrophobic fibers.

3. The reinforcing fibers according to claim 2, wherein the hydrophobic fibers are polyester fibers.

4. The reinforcing fibers according to claim 1, wherein the reinforcing fibers are multifilaments.

5. The reinforcing fibers according to claim 1, wherein the number-average molecular weight (Mn) of the modified conjugated diene rubber is from more than 20,000 to 200,000.

6. The reinforcing fibers according to claim 1, wherein the modified conjugated diene rubber comprises a monomer unit derived from at least one selected from the group consisting of butadiene and isoprene.

7. The reinforcing fibers according to claim 1, wherein the hydrogen-bonding functional group is at least one selected from the group consisting of a hydroxy group; an aldehyde group and an acetalized form thereof; a carboxy group, a salt thereof, an esterified form thereof and an acid anhydride thereof; and a silanol group and an esterified form thereof.

8. The reinforcing fibers according to claim 1, wherein an adhesion amount of the adhesive component is from 0.1% by mass to 10% by mass relative to the reinforcing fibers.

9. A method for producing the reinforcing fibers of claim 1, the method comprising:
adhering the adhesive component to the surfaces of hydrophilic fibers, thereby obtaining adhesive component-adhered hydrophilic fibers,
heat-treating the adhesive component-adhered hydrophilic fibers at 200° C. or lower.

10. A woven fabric or a knitted fabric comprising the reinforcing fibers of claim 1 in at least a part of the woven fabric or knitted fabric.

11. A molded article, comprising the reinforcing fibers of claim 1.

12. The molded article according to claim 11, further comprising a rubber component.

13. The molded article according to claim 12, which is a tire, a belt or a hose.

14. The reinforcing fibers according to claim 1, wherein the modified conjugated diene rubber is liquid.

15. The reinforcing fibers according to claim 1, wherein the modified conjugated diene rubber comprises 10 mol % or less of a monomer unit derived from an aromatic vinyl compound.

16. The reinforcing fibers according to claim 1, wherein the adhesive component comprises a triethoxysilane-modified polybutadiene as the modified conjugated diene rubber and a polyoxyethylene C12 to 15 alkyl ether phosphate as the emulsifier.

17. The reinforcing fibers according to claim 1, wherein the modified conjugated diene rubber comprises a monomer unit derived from at least one selected from the group consisting of β-farnesene and α-farnesene.

18. The reinforcing fibers according to claim 1, wherein the number of the hydrogen-bonding functional groups in the modified conjugated diene rubber is from 2 to 30 per molecule on average.

19. Reinforcing fibers, comprising:
hydrophilic fibers and
an adhesive component,
wherein:
  surfaces of the hydrophilic fibers are at least partially covered with the adhesive component,
  the adhesive component comprises a modified conjugated diene rubber having a hydrogen-bonding functional group in a part of the modified conjugated diene rubber, and an emulsifier,
  the number of the hydrogen-bonding functional groups in the modified conjugated diene rubber is from 2 to 150 per molecule on average, and
  a melt viscosity measured at 38° C. of the modified conjugated diene rubber is from 85 to 4,000 Pa·s.

20. Reinforcing fibers, comprising:
hydrophilic fibers and
an adhesive component,
wherein:
  surfaces of the hydrophilic fibers are at least partially covered with the adhesive component,
  the adhesive component comprises a modified conjugated diene rubber having a hydrogen-bonding functional group in a part of the modified conjugated diene rubber, and an emulsifier,
  the number of the hydrogen-bonding functional groups in the modified conjugated diene rubber is from 2 to 150 per molecule on average,
  a melt viscosity measured at 38° C. of the modified conjugated diene rubber is from 0.1 to 4,000 Pa·s, and
  an amount of the adhesive component adhered to the reinforcing fibers is 3.8% by mass or less.

* * * * *